(12) United States Patent
Kitzman et al.

(10) Patent No.: US 12,352,102 B2
(45) Date of Patent: Jul. 8, 2025

(54) AEROGEL GLAZING ADHESION AND IG UNIT TECHNOLOGY

(71) Applicant: Cardinal CG Company, Eden Prairie, MN (US)

(72) Inventors: Kellen C. Kitzman, Middleton, WI (US); Keith James Burrows, Mineral Point, WI (US); Kari B. Myli, Sauk City, WI (US)

(73) Assignee: Cardinal CG Company, Eden Prairie, MN (US)

( * ) Notice: Subject to any disclaimer, the term of this patent is extended or adjusted under 35 U.S.C. 154(b) by 306 days.

(21) Appl. No.: 17/971,176

(22) Filed: Oct. 21, 2022

(65) Prior Publication Data

US 2023/0050347 A1 Feb. 16, 2023

Related U.S. Application Data

(63) Continuation-in-part of application No. 17/390,178, filed on Jul. 30, 2021.
(Continued)

(51) Int. Cl.
*E06B 3/67* (2006.01)
*B32B 7/12* (2006.01)
(Continued)

(52) U.S. Cl.
CPC ............. *E06B 3/6715* (2013.01); *B32B 7/12* (2013.01); *B32B 7/14* (2013.01); *B32B 17/06* (2013.01);
(Continued)

(58) Field of Classification Search
CPC ......... Y02A 30/249; Y02B 80/22; E06B 3/66; E06B 3/6612; E06B 3/67; E06B 3/6715;
(Continued)

(56) References Cited

U.S. PATENT DOCUMENTS

| | | | |
|---|---|---|---|
| 4,402,927 A | 9/1983 | Von Dardel et al. | |
| 4,610,863 A | 9/1986 | Tewari et al. | |

(Continued)

FOREIGN PATENT DOCUMENTS

| | | | |
|---|---|---|---|
| AU | 688208 B2 | 3/1998 | |
| CA | 2036634 A1 | 9/1991 | |

(Continued)

OTHER PUBLICATIONS

Machine translation of CN 206581822 U.*
(Continued)

*Primary Examiner* — Z. Jim Yang
(74) *Attorney, Agent, or Firm* — Fredrikson & Byron, P.A.

(57) ABSTRACT

The invention provides an IG unit that includes two glass sheets and an aerogel sheet located between the two glass sheets. The aerogel sheet is adhered to an interior surface of one of the two glass sheets by an adhesive, such that a face of the aerogel sheet is carried alongside the interior surface and has a portion that is devoid of the adhesive. In some cases, the adhesive is outside a vision area of the unit. In some cases, the adhesive securing the aerogel sheet to the interior surface is in contact with the first face of the aerogel sheet, and the adhesive contacts less than 10% of the first face of the aerogel sheet. Furthermore, some embodiments provide a glazing assembly that includes a frame and an IG unit mounted in the frame such that a vision area of the glazing assembly is located inwardly of the frame.

23 Claims, 13 Drawing Sheets

Related U.S. Application Data

(60) Provisional application No. 63/062,910, filed on Aug. 7, 2020.

(51) Int. Cl.

| | | |
|---|---|---|
| *B32B 7/14* | (2006.01) | |
| *B32B 17/06* | (2006.01) | |
| *E06B 3/663* | (2006.01) | |
| *E06B 3/667* | (2006.01) | |
| *E06B 3/673* | (2006.01) | |

(52) U.S. Cl.
CPC .......... *E06B 3/66342* (2013.01); *E06B 3/667* (2013.01); *E06B 3/67326* (2013.01); *B32B 2266/126* (2016.11)

(58) Field of Classification Search
CPC . E06B 3/677; E06B 3/6775; B32B 2307/102; B32B 2307/304; B32B 17/10–1099; B32B 2266/126; B32B 2266/128
See application file for complete search history.

(56) References Cited

U.S. PATENT DOCUMENTS

| | | | |
|---|---|---|---|
| 4,765,818 A | 8/1988 | Che et al. | |
| 4,928,448 A | 5/1990 | Phillip | |
| 5,027,574 A | 7/1991 | Phillip | |
| 5,092,101 A | 3/1992 | Kunert | |
| 5,118,543 A | 6/1992 | Mccoll | |
| 5,119,608 A * | 6/1992 | Glover | E06B 3/6715 52/786.13 |
| 5,154,953 A | 10/1992 | De Moncuit et al. | |
| 5,156,895 A | 10/1992 | Martin | |
| 5,242,647 A | 9/1993 | Poco | |
| 5,294,480 A | 3/1994 | Mielke et al. | |
| 5,524,381 A | 6/1996 | Chahroudi | |
| 5,525,430 A | 6/1996 | Chahroudi | |
| 6,627,305 B1 | 9/2003 | Deane et al. | |
| 7,117,914 B2 | 10/2006 | Chick | |
| 7,143,800 B2 | 12/2006 | Chick | |
| 7,339,728 B2 | 3/2008 | Hartig | |
| 7,342,716 B2 | 3/2008 | Hartig | |
| 7,572,509 B2 | 8/2009 | Hartig | |
| 7,572,510 B2 | 8/2009 | Hartig | |
| 7,572,511 B2 | 8/2009 | Hartig | |
| 7,780,890 B2 | 8/2010 | Lee et al. | |
| 7,832,177 B2 | 11/2010 | Stark | |
| 7,906,203 B2 | 3/2011 | Hartig | |
| 7,919,158 B2 | 4/2011 | Seth et al. | |
| 8,110,258 B2 | 2/2012 | Milburn | |
| 8,381,490 B2 | 2/2013 | Back et al. | |
| 8,557,356 B2 | 10/2013 | Colson | |
| 8,595,994 B1 | 12/2013 | Grommesh et al. | |
| 8,652,282 B2 | 2/2014 | Milburn | |
| 8,844,218 B2 | 9/2014 | Showers | |
| 8,968,865 B2 | 3/2015 | Worsley et al. | |
| 9,034,934 B1 | 5/2015 | Attia | |
| 9,045,609 B2 | 6/2015 | Pasquero et al. | |
| 9,068,346 B1 | 6/2015 | Lu et al. | |
| 9,249,272 B2 | 2/2016 | Pasquero et al. | |
| 9,862,640 B2 | 1/2018 | Pfaff et al. | |
| 10,000,411 B2 | 6/2018 | Burrows et al. | |
| 10,000,965 B2 | 6/2018 | Burrows et al. | |
| 10,421,253 B2 | 9/2019 | Van Overmeere et al. | |
| 10,500,557 B2 | 12/2019 | Sakaguchi et al. | |
| 2002/0102674 A1 | 8/2002 | Anderson | |
| 2005/0074566 A1 | 4/2005 | Rouanet et al. | |
| 2007/0082124 A1 | 4/2007 | Hartig | |
| 2008/0258065 A1 | 10/2008 | Banks | |
| 2008/0302059 A1 | 12/2008 | Du Plessis et al. | |
| 2009/0029147 A1 | 1/2009 | Tang et al. | |
| 2010/0146880 A1 | 6/2010 | Valentz et al. | |
| 2011/0206874 A1 | 8/2011 | Showers | |
| 2012/0081794 A1 | 4/2012 | Showers | |
| 2012/0128958 A1 | 5/2012 | Zeng et al. | |
| 2013/0136664 A1 | 5/2013 | Bono et al. | |
| 2013/0170218 A1 | 7/2013 | Wolk et al. | |
| 2013/0202890 A1 | 8/2013 | Kong et al. | |
| 2014/0065329 A1 | 3/2014 | Showers | |
| 2014/0116516 A1 | 5/2014 | Jones | |
| 2014/0141199 A1 | 5/2014 | Leonard | |
| 2014/0287641 A1 * | 9/2014 | Steiner, III | B32B 5/26 428/317.1 |
| 2015/0004087 A1 | 1/2015 | Zettl et al. | |
| 2015/0077957 A1 | 3/2015 | Sakatani et al. | |
| 2015/0315779 A1 * | 11/2015 | Baily | B32B 25/04 29/469 |
| 2016/0097502 A1 | 4/2016 | Padiyath et al. | |
| 2016/0138323 A1 * | 5/2016 | Sønderkær | E06B 3/6617 52/173.1 |
| 2016/0138324 A1 | 5/2016 | Lameris et al. | |
| 2016/0160557 A1 | 6/2016 | Kim et al. | |
| 2016/0319588 A1 | 11/2016 | Samanta et al. | |
| 2017/0028686 A1 | 2/2017 | Wilson et al. | |
| 2018/0066469 A1 | 3/2018 | Vogel-Martin et al. | |
| 2018/0093456 A1 | 4/2018 | Van Overmeere et al. | |
| 2018/0134194 A1 | 5/2018 | Kawamura et al. | |
| 2018/0166353 A1 | 6/2018 | Garnet et al. | |
| 2018/0237608 A1 | 8/2018 | Hess et al. | |
| 2018/0250913 A1 | 9/2018 | Kotake et al. | |
| 2018/0264784 A1 | 9/2018 | Murofushi et al. | |
| 2018/0320824 A1 | 11/2018 | Fay et al. | |
| 2019/0063146 A1 * | 2/2019 | Freese | E06B 7/10 |
| 2019/0154188 A1 | 5/2019 | Fujii et al. | |
| 2019/0333490 A1 * | 10/2019 | Wang | B32B 9/045 |
| 2020/0148587 A1 | 5/2020 | Burrows et al. | |
| 2020/0340612 A1 | 10/2020 | Kawamura et al. | |
| 2021/0094255 A1 | 4/2021 | Benkoski et al. | |
| 2021/0207428 A1 | 7/2021 | Pilon et al. | |
| 2021/0363812 A1 | 11/2021 | Hajjaj et al. | |
| 2022/0042369 A1 | 2/2022 | Burrows | |
| 2022/0042370 A1 | 2/2022 | Burrows | |
| 2022/0332633 A1 | 10/2022 | Burrows et al. | |
| 2022/0369480 A1 * | 11/2022 | Sage | F24C 7/086 |
| 2024/0313302 A1 * | 9/2024 | Williams | H01M 10/6567 |

FOREIGN PATENT DOCUMENTS

| | | | |
|---|---|---|---|
| CN | 101481985 A | | 7/2009 |
| CN | 102180603 A | | 9/2011 |
| CN | 202706291 U | | 1/2013 |
| CN | 104898295 A | | 9/2015 |
| CN | 105201355 A | | 12/2015 |
| CN | 204936377 U | | 1/2016 |
| CN | 205117117 U | | 3/2016 |
| CN | 205117118 U | | 3/2016 |
| CN | 106082697 A | | 11/2016 |
| CN | 205736249 U | | 11/2016 |
| CN | 206581820 U | | 10/2017 |
| CN | 206581822 U | * | 10/2017 |
| CN | 206589417 U | | 10/2017 |
| CN | 206983435 U | | 2/2018 |
| CN | 207190441 U | | 4/2018 |
| CN | 108060874 A | | 5/2018 |
| CN | 108623194 A | | 10/2018 |
| CN | 108625741 A | | 10/2018 |
| CN | 109502997 A | | 3/2019 |
| CN | 109592908 A | | 4/2019 |
| CN | 109989680 A | | 7/2019 |
| CN | 211257362 U | * | 8/2020 |
| CN | 112431520 A | | 3/2021 |
| EP | 1414266 A2 | | 4/2004 |
| EP | 3112773 A1 | | 1/2017 |
| GB | 2241468 A | | 9/1991 |
| KR | 101583005 B1 | | 12/2015 |
| WO | 2006065904 A1 | | 6/2006 |
| WO | 2006121954 A1 | | 11/2006 |
| WO | 2008047027 A1 | | 4/2008 |
| WO | 2017090686 A1 | | 6/2017 |
| WO | 2017147463 A1 | | 8/2017 |
| WO | 2018170772 A1 | | 9/2018 |
| WO | 2019241603 A1 | | 12/2019 |
| WO | 2020005965 A1 | | 1/2020 |

(56) References Cited

FOREIGN PATENT DOCUMENTS

| WO | 2020084668 A1 | 4/2020 |
|---|---|---|
| WO | 2021129488 A1 | 7/2021 |
| WO | 2021224228 A1 | 11/2021 |
| WO | 2022031536 A1 | 2/2022 |

OTHER PUBLICATIONS

Machine translation of CN 211257362 U.*
International Patent Application No. PCT/US2023/077387, International Search Report and Written Opinion mailed Jan. 15, 2024, 13 pages.
Valachova, D. et al., "Using of Aerogel To Improve Thermal Insulating Properties of Windows," Civil and Environmental Engineering, vol. 14, Issue 1/2018, 2-11. 10 pages.
Strobach, E., "Optically Transparent, Thermally Insulating and Soundproofing (OTTIS) Aerogel for High-Efficiency Window Applications," Massachusetts Institute of Technology, Jan. 15, 2020, 119 pages.
"Insight on Color," "Hunter L, a, b Color Scale," Applications Note, vol. 8, U.S. Pat. No. 9,06/08,2008, 4 pages.
Bhuiya, M.M.H et al., "Preparation of Monolithic Silica Aerogel for Fenestration Applications: Scaling up, Reducing Cycle Time and Improving Performance," Ind. Chem. Res. (2016), 55, 6971-6981, 11 pages.
Buettner, "Investigation of Bacterial Cellulose as a Carbon Fiber Precurser and its Potential for Piezoelectric Energy Harvesting," Thesis, Cornell University, Aug. 2014, 90 pages.
Full English Translation of CN 109989680 A, published Jul. 9, 2019, 36 pages.
International Patent Application No. PCT/US2021/043895, International Search Report and Written Opinion mailed Oct. 20, 2021, 11 pages.
Jensen, K.I. et al., "Development of windows based on highly insulating aerogel glazings," Journal of Non-Crystalline Solids, 350 (2004) 351-357, 7 pages.
Jia et al., "Preparation and characterization of a novel bacterial cellulose/chitosan bio-hydrogel," Nanomaterials and Nanotechnology, vol. 7, 2017, pp. 1-8.
Leitch et al., "Bacterial Nanocellulose Aerogel Membranes: Novel High-Porosity Materials for Membrane Distillation," Environmental Science and Technology Letters, vol. 3, 2016, pp. 85-91.
Merli, F et al., "Acoustic measurements on monolithic aerogel samples and application of the seleced solutions to standard window systems," Applied Acoustics, 142 (2018), 123-131, 9 pages.
Paakko et al., "Long and entangled native cellulose I nanofibers allow flexible aerogels and hierarchically porous templates for functionalities" , Soft Matter, 2008, 4, Published Sep. 23, 2008, pp. 2492-2499.
Wilson, "Fascinating world of gas-fill windows", Brattleboro Reformer, Downloaded from www.reformer.com/local-news/fascinating-world-of-gas-fill-windows/article_55f4a3be-da2f-5ba8-8da8-d5b44209f040.html, Published Apr. 3, 2012, pp. 3.

* cited by examiner

AEROGEL GLAZING ADHESION AND IG UNIT TECHNOLOGY

RELATED APPLICATIONS

This application is a continuation-in-part of Ser. No. 17/390,178, filed Jul. 30, 2021, and claims priority to U.S. Provisional Patent Application No. 63/062,910, filed Aug. 7, 2020.

FIELD OF THE INVENTION

The present invention relates to window, glazing, and aerogel technologies. More particularly, the present invention relates to IG units, glazing assemblies, and aerogel technology.

BACKGROUND OF THE INVENTION

Aerogel is a known insulation material that can be used between two glass sheets. In some cases, aerogel is provided in granular, particulate form. In other cases, aerogel is produced in the form of a sheet.

It would be desirable to provide IG units and glazing assemblies that include an aerogel sheet adhered to one of the panes by an advantageous adhesive arrangement.

SUMMARY OF THE INVENTION

Figure 1:
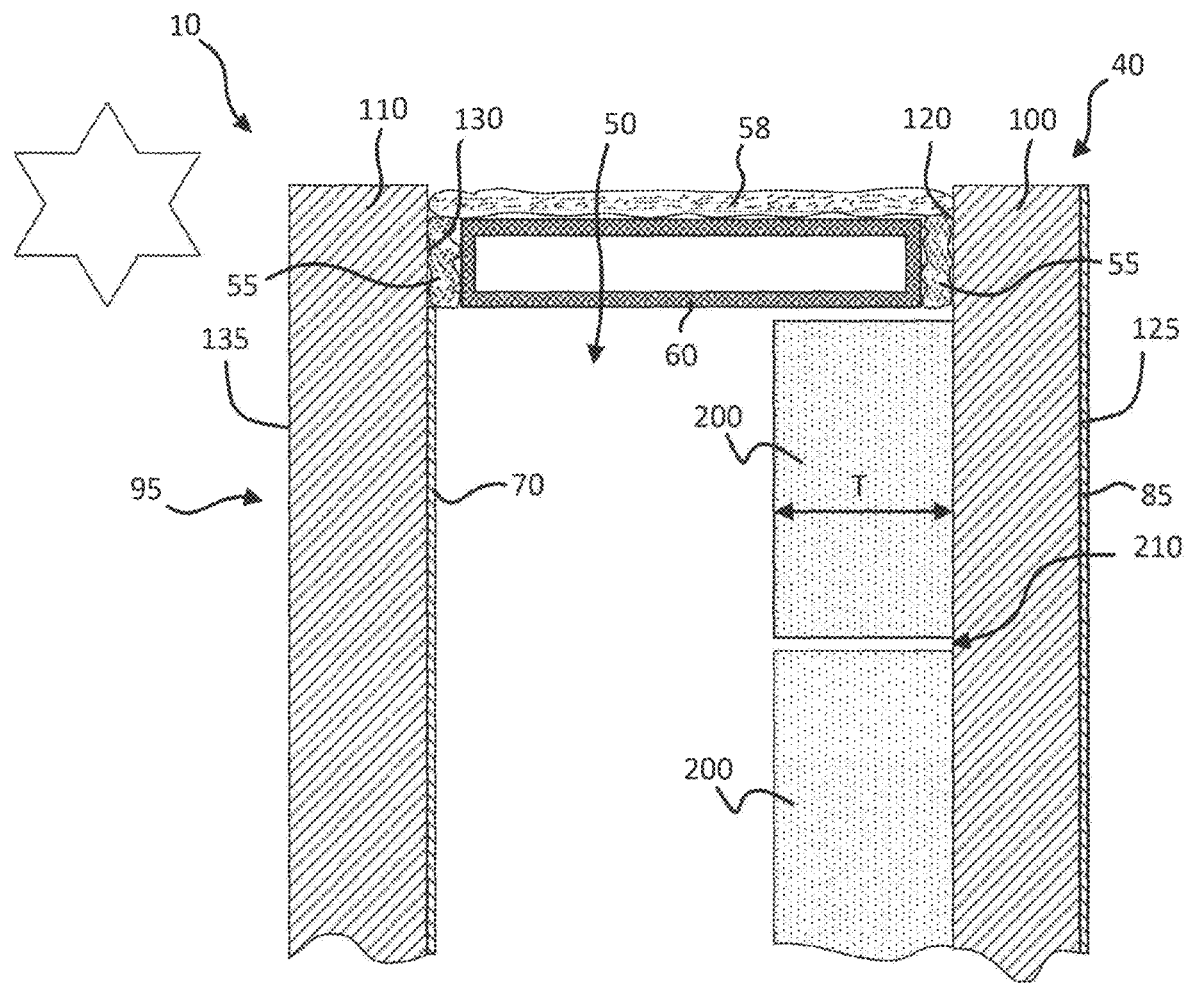
FIG. 1 is a schematic, broken-away, cross-sectional side view of an optical device in accordance with certain embodiments of the present invention.
Figure 2:
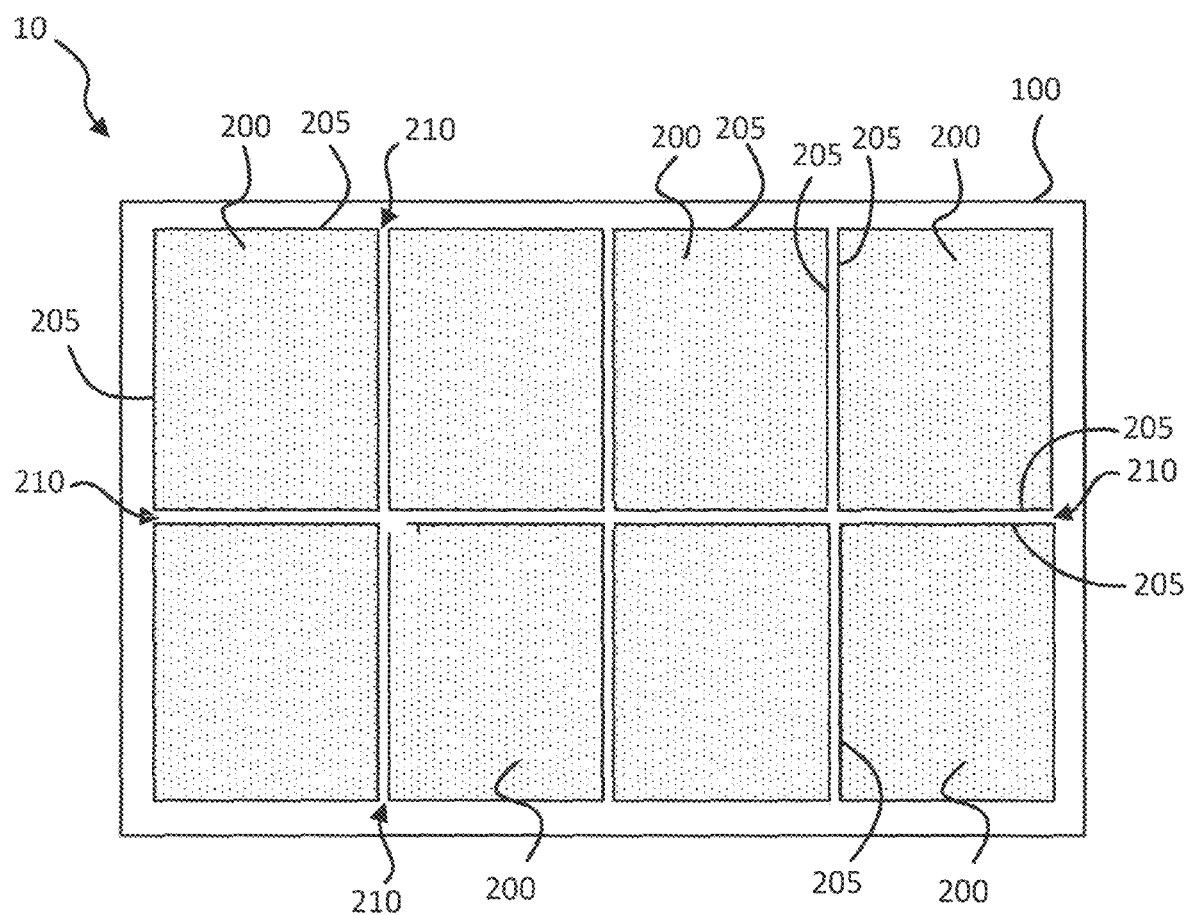
FIG. 2 is a schematic front view of an optical device in accordance with certain embodiments of the invention.
Figure 3:
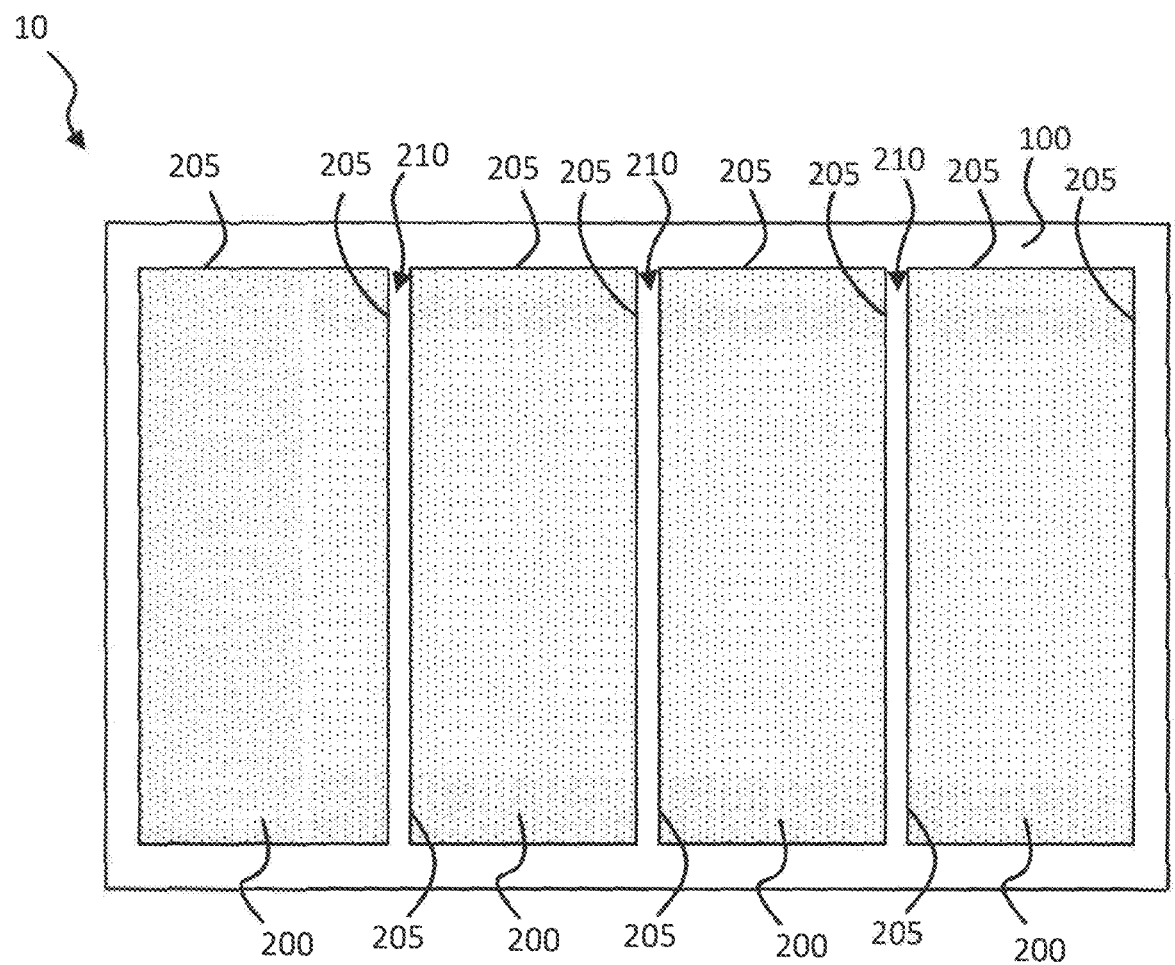
FIG. 3 is a schematic front view of an optical device in accordance with other embodiments of the invention.
Figure 4:
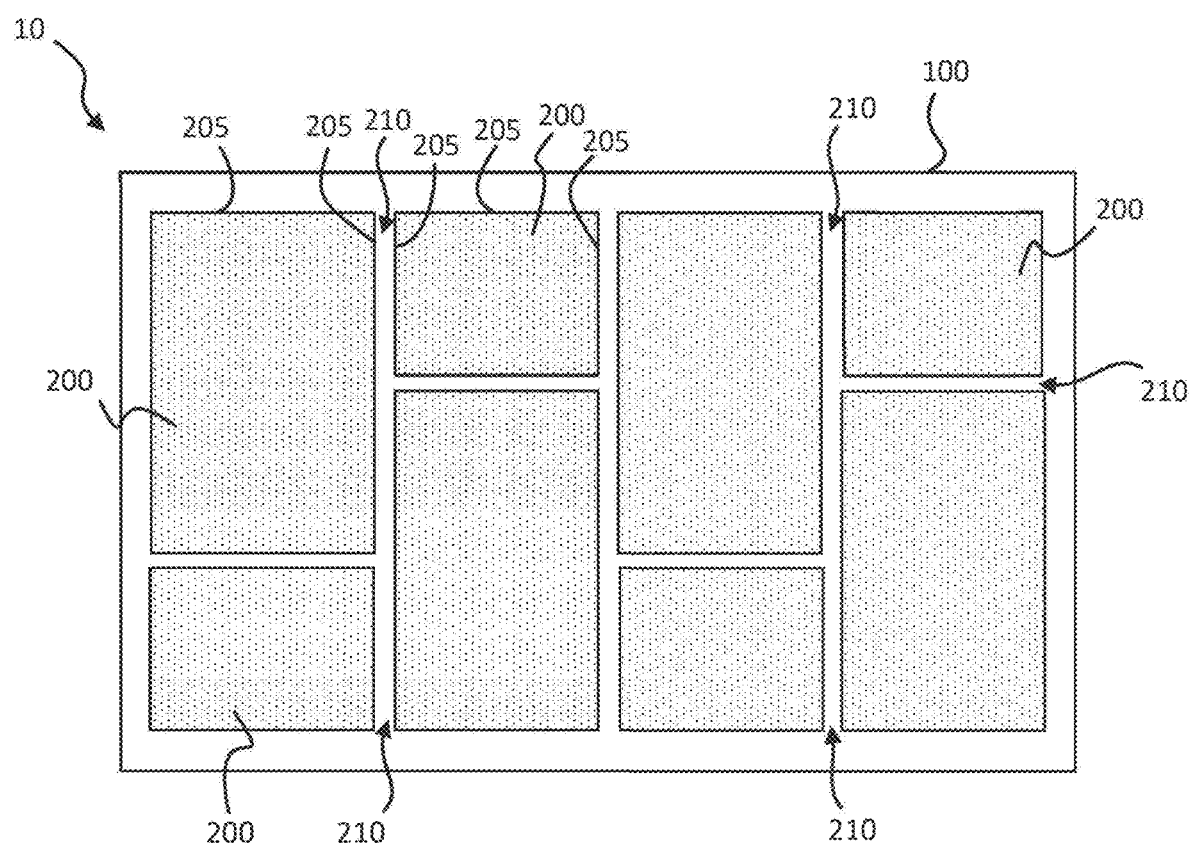
FIG. 4 is a schematic front view of an optical device in accordance with still other embodiments of the invention.

Certain embodiments provide an optical device comprising a glass assembly unit. The glass assembly unit comprises two glass sheets and a plurality of aerogel sheets. The aerogel sheets are arranged in a tiled configuration between the two glass sheets so as to cover a majority of a unit area of the glass assembly unit. In some embodiments, the tiled configuration is characterized by each of the aerogel sheets being spaced from an adjacent one of the aerogel sheets by a gap distance of no greater than 5 mm. In other embodiments, the tiled configuration is characterized by each of the aerogel sheets being in edge-to-edge contact with an adjacent one of the aerogel sheets.

Some embodiments provide an optical device comprising a multiple-pane insulating glazing unit. The multiple-pane insulating glazing unit comprises two glass sheets and a between-pane space. The between-pane space is located between the two glass sheets. The multiple-pane insulating glazing unit further comprises a plurality of aerogel sheets arranged in a tiled configuration. The aerogel sheets are arranged in the tiled configuration inside the between-pane space and are adhered to an interior surface of a first one of the two glass sheets. The aerogel sheets are arranged so as to cover a majority of a unit area of the multiple-pane insulating glazing unit.

Certain other embodiments provide an optical device comprising a multiple-pane insulating glazing unit. The multiple-pane insulating glazing unit comprises two glass sheets and a between-pane space. The between-pane space is located between the two glass sheets. The multiple-pane insulating glazing unit further comprises a plurality of aerogel sheets arranged in a tiled configuration. The aerogel sheets are arranged in the tiled configuration inside the between-pane space and are adhered to an interior surface of a first one of the two glass sheets. The tiled configuration is characterized by each of the aerogel sheets being spaced from an adjacent one of the aerogel sheets by a gap. Each gap has a distance of no greater than 5 mm.

Still other embodiments provide an optical device comprising a multiple-pane insulating glazing unit. The multiple-pane insulating glazing unit comprises two glass sheets and a between-pane space. The between-pane space is located between the two glass sheets. The multiple-pane insulating glazing unit further comprises a plurality of aerogel sheets arranged in a tiled configuration. The aerogel sheets are arranged in the tiled configuration inside the between-pane space and are adhered to an interior surface of a first one of the two glass sheets. The tiled configuration is characterized by each of the aerogel sheets being in edge-to-edge contact with an adjacent one of the aerogel sheets.

Certain other embodiments provide an optical device comprising a laminated glass assembly. The laminated glass assembly comprises two glass sheets and a plurality of aerogel sheets. The aerogel sheets are arranged in a tiled configuration between the two glass sheets. The aerogel sheets are arranged so as to cover a majority of a unit area of the laminated glass assembly. In some embodiments, the tiled configuration is characterized by each aerogel sheet being spaced from an adjacent one of the aerogel sheets by a gap distance of no greater than 5 mm. In other embodiments, the tiled configuration is characterized by each aerogel sheet being in edge-to-edge contact with an adjacent one of the aerogel sheets.

In certain embodiments, the invention provides an IG unit or a laminated glass panel having one or more aerogel sheets located between two glass sheets. In the present embodiments, the one or more aerogel sheets are positioned such that when the IG unit or laminated glass panel is mounted in a frame, perimeter edges of the aerogel sheet(s) are outside a vision area. In the present embodiments, there may be only a single aerogel sheet, rather than a plurality of aerogel sheets arranged in a tiled configuration. However, the aerogel in the present embodiments can also be provided in the form of multiple aerogel sheets in a tiled configuration. There can optionally be a spacer and/or an edge sealant bead from which the perimeter edges of the aerogel sheet(s) are separated.

Some embodiments of the invention provide a multiple-pane insulating glazing unit that includes two glass sheets and an aerogel sheet located between the two glass sheets. The aerogel sheet is adhered to an interior surface of one of the two glass sheets by an optical adhesive, such that a face of the aerogel sheet is carried alongside the noted interior surface and has a portion that is devoid of the optical adhesive. Preferably, the aerogel sheet has perimeter edges and is positioned such that the perimeter edges of the aerogel sheet are outside a vision area of the multiple-pane insulating glazing unit when the multiple-pane insulating glazing unit is mounted in a frame. Furthermore, the optical adhesive preferably is located at a perimeter of the aerogel sheet.

In some embodiments, the invention provides a glazing assembly that includes a frame and a multiple-pane insulating glazing unit mounted in the frame such that a vision area of the glazing assembly is located inwardly of the frame. In the present embodiments, the multiple-pane insulating glazing unit includes two glass sheets, a spacer, and an aerogel sheet. The spacer has two opposed sides sealed respectively to the two glass sheets by first and second sealant regions. The aerogel sheet is located between the two glass sheets. In the present embodiments, the glazing assembly further includes a perimetrical adhesive field that has adhesive securing the aerogel sheet to an interior surface of one of the two glass sheets. The perimetrical adhesive field is located outside a vision area of the glazing assembly, such that the vision area is devoid of the adhesive. Preferably, the aerogel sheet spans an entirety of the vision area.

Certain embodiments of the invention provide a multiple-pane insulating glazing unit that includes two glass sheets and an aerogel sheet located between the two glass sheets. In the present embodiments, the glazing assembly includes a perimetrical adhesive field that has adhesive securing the aerogel sheet to an interior surface of one of the two glass sheets. The perimetrical adhesive field is located outside a vision area of the multiple-pane insulating glazing unit, such that the vision area is devoid of the adhesive. Preferably, the aerogel sheet spans an entirety of the vision area.

Some embodiments of the invention provide a multiple-pane insulating glazing unit that includes two glass sheets, a spacer, and an aerogel sheet. In the present embodiments, the aerogel sheet is located between the two glass sheets, a gas gap is located alongside the aerogel sheet, and the spacer is connected by sealant to the two glass sheets. Furthermore, in the present embodiments, the multiple-pane insulating glazing unit further includes an optical adhesive adhering the aerogel sheet to an interior surface of one of the two glass sheets, such that a face of the aerogel sheet is carried alongside the noted interior surface and has a portion that is devoid of the optical adhesive.

In certain embodiments, the invention provides a glazing assembly that includes a frame and a multiple-pane insulating glazing unit mounted in the frame such that a vision area of the glazing assembly is located inwardly of the frame. In the present embodiments, the multiple-pane insulating glazing unit includes two glass sheets, a spacer, and an aerogel sheet. Moreover, in the present embodiments, the aerogel sheet is located between the two glass sheets, a gas gap is located alongside the aerogel sheet, and the spacer has two opposed sides sealed respectively to the two glass sheets by first and second sealant regions. Furthermore, in the present embodiments, the glazing assembly further includes a perimetrical adhesive field where adhesive secures the aerogel sheet to an interior surface of one of the two glass sheets. The perimetrical adhesive field is located outside the vision area of the glazing assembly, such that the vision area of the glazing assembly is devoid of the adhesive. Preferably, the aerogel sheet spans an entirety of the vision area.

Certain embodiments of the invention provide a multiple-pane insulating glazing unit that includes two glass sheets, a spacer, and an aerogel sheet. In the present embodiments, the aerogel sheet is located between the two glass sheets, a gas gap is located alongside the aerogel sheet, and the spacer has two opposed sides sealed respectively to the two glass sheets by first and second sealant regions. Moreover, in the present embodiments, the multiple-pane insulating glazing unit further includes a perimetrical adhesive field where adhesive secures the aerogel sheet to an interior surface of one of the two glass sheets. The perimetrical adhesive field is located outside a vision area of the multiple-pane insulating glazing unit, such that the vision area is devoid of the adhesive. Preferably, the aerogel sheet spans an entirety of the vision area.

In some embodiments, the invention provides a multiple-pane insulating glazing unit that includes two glass sheets, a spacer, and an aerogel sheet. In the present embodiments, the aerogel sheet is located between the two glass sheets, such that a gas gap is located alongside the aerogel sheet. The spacer has two opposed sides sealed respectively to the two glass sheets by first and second sealant regions. The multiple-pane insulating glazing unit further includes an adhesive securing the aerogel sheet to an interior surface of one of the two glass sheet. The aerogel sheet has opposed first and second faces, and the adhesive securing the aerogel sheet to the noted interior surface is in contact with the first face of the aerogel sheet. In the present embodiments, the adhesive contacts less than 10% of the first face of the aerogel sheet. In some cases, the adhesive contacts 1-5% of the first face of the aerogel sheet. Preferably, the adhesive is spaced apart by more than 0.1 inch and less than 1.5 inches from an adjacent edge of the one of the two glass sheets to which the adhesive secures the aerogel sheet. Furthermore, in some cases, the adhesive occupies a perimetrical adhesive field that is located outside a vision area of the multiple-pane insulating glazing unit, such that the vision area of the multiple-pane insulating glazing unit is devoid of the adhesive. In such cases, the perimetrical adhesive field can optionally have a width in a range of from 1 mm to 25 mm.

Certain embodiments of the invention provide a multiple-pane insulating glazing unit that includes two glass sheets, a spacer, and an aerogel sheet. In the present embodiments, the aerogel sheet is located between the two glass sheets, a gas gap is located alongside the aerogel sheet, and the spacer has two opposed sides sealed respectively to the two glass sheets by first and second sealant regions. Moreover, in the present embodiments, the multiple-pane insulating glazing unit further includes a perimetrical adhesive field where adhesive secures the aerogel sheet to an interior surface of one of the two glass sheets. The perimetrical adhesive field is located at least substantially entirely outside a vision area of the multiple-pane insulating glazing unit, such that the vision area is at least substantially devoid of the adhesive. Preferably, the aerogel sheet spans an entirety of the vision area.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Figure 7:
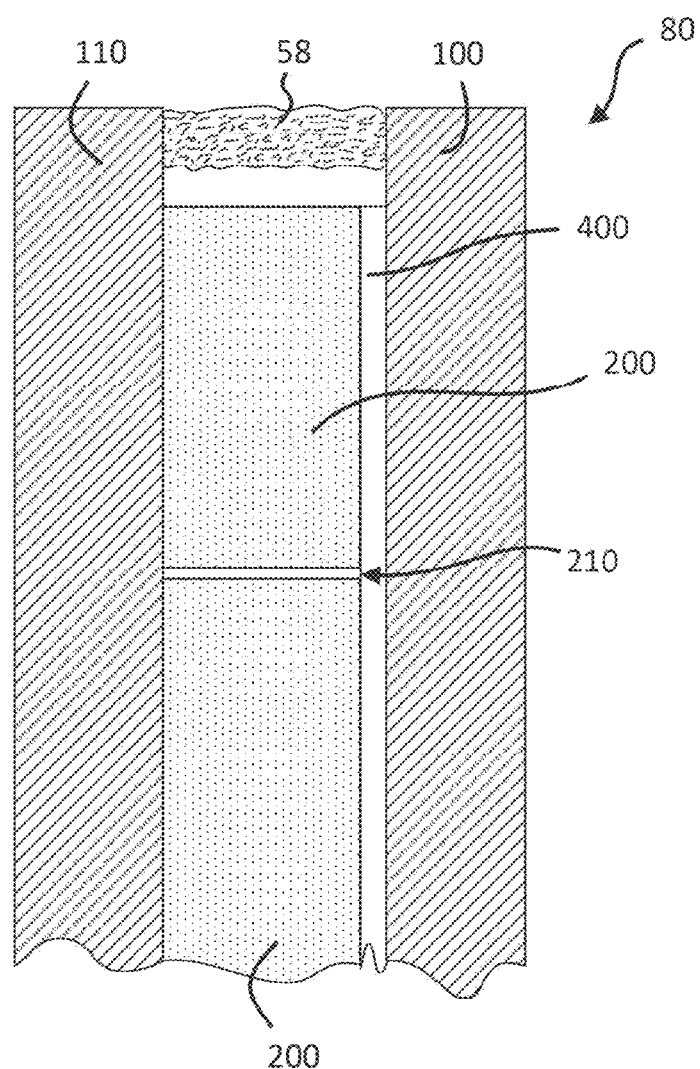
FIG. 7 is a schematic, broken-away, cross-sectional side view of a laminated glass assembly in accordance with certain embodiments of the invention.

Referring to the drawings, and starting with FIG. 1, there is shown an optical device of the present disclosure generally represented by reference numeral 10. The optical device 10 comprises a glass assembly unit that includes a first glass sheet 100, a second glass sheet 110, and one or more aerogel sheets 200. The one or more aerogel sheets 200 are arranged between the first 100 and second 110 glass sheets. FIG. 1 shows an embodiment where the glass assembly unit comprises (e.g., is) a multiple-pane insulating glazing unit 40. This, however, is not required in all embodiments. For example, in other cases, the glass assembly unit comprises (e.g., is) a laminated glass assembly 80 (FIG. 7). More will be said of this later.

A variety of known glass types can be used for the first 100 and second glass sheets 110, including soda-lime glass or borosilicate glass. In some cases, it may be desirable to use "white glass," a low iron glass, etc. In certain embodiments, the glass sheets are part of a window, door, skylight, or other glazing.

Glass sheets of various sizes can be used in the present invention. Commonly, large-area glass sheets are used. Certain embodiments involve first and second glass sheets each having a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters. In some embodiments, each glass sheet is a jumbo glass sheet having a length and/or width that is between about 3 meters and about 10 meters, e.g., a glass sheet having a width of about 3.5 meters and a length of about 6.5 meters.

Glass sheets of various thicknesses can be used in the present invention. In some embodiments, each glass sheet has a thickness of about 1-8 mm. Certain embodiments involve glass sheets with a thickness of between about 2.3 mm and about 4.8 mm, and perhaps more preferably between about 2.5 mm and about 4.8 mm. In one particular embodiment, glass sheets (e.g., soda-lime glass) with a thickness of about 3 mm are used.

The first glass sheet 100 has opposed surfaces 120, 125, which preferably are opposed major surfaces (or "opposed faces"). Similarly, the second glass sheet 110 has opposed surfaces 130, 135, which preferably are opposed major surfaces. In some cases, as shown in FIG. 1, surfaces 120 and 130 are interior surfaces facing a between-pane space 50, while surfaces 125 and 135 are exterior surfaces, e.g., such that surface 135 is an exterior surface exposed to an outdoor environment (and thus exposed to periodic contact with rain). This, however, is not required.

As used herein, the term "aerogel" refers to a material that is obtained by combining either a nonfluid colloidal network or a polymer network with liquid so as to form a gel, and then removing the liquid from the gel and replacing the liquid with a gas or vacuum. As discussed in greater detail below, the resulting aerogel (and particularly each preferred aerogel noted below) has a very low density and provides excellent insulating properties.

The aerogel 200 of the present disclosure can comprise (e.g., can be), for example, a silica-based aerogel or a polymer-based aerogel. In cases where silica-based aerogel is used, the aerogel 200 can advantageously be produced, and have properties, in accordance with U.S. Patent Application No. 63/318,165, entitled "Silica Wet Gel and Aerogel Materials," the contents of which are incorporated herein by reference. Any suitable aerogel material can be used in the present embodiments. In some cases, the aerogel is a cellulose-based aerogel. Aerogels of this nature are described in U.S. Patent Application Publication No. US2019/0055373, entitled "Bacterial Cellulose Gels, Process for Producing and Methods of Use," the teachings of which are incorporated herein by reference. In such cases, the aerogel can contain cellulosic nanocomposites that are aligned in ordered liquid crystal phases. Various other aerogel materials are commercially available and/or otherwise known, and may also be used.

In the present invention, the aerogel preferably is provided in the form of one or more sheets. This is in contrast to aerogel in flowable granular or otherwise particulate form. The aerogel sheet(s) preferably are self-supporting, i.e., once fully synthesized and formed, the sheet(s) can retain sheet form without being adhered to glass or another support. It is to be appreciated, however, that once incorporated into the insulating glazing unit, the (or each) aerogel sheet preferably is supported by one of the glass sheets 100, 110. As illustrated, there preferably is no cell or honeycomb structure surrounding/containing particulate aerogel. As illustrated, the (or each) aerogel sheet 200 has opposed first 200F and second faces.

In some embodiments, multiple aerogel sheets 200 are arranged in a tiled configuration between the two glass sheets 100, 110. In such cases, the multiple aerogel sheets 200 preferably are collectively arranged (optionally in a non-overlapping manner) so as to cover a majority (i.e., greater than 50%) of the unit area of the glass assembly unit. In some embodiments, multiple aerogel sheets 200 are arranged in the tiled configuration so as to cover more than 60% (e.g., more than 70%, more than 80%, or even more than 90%) of the unit area of the glass assembly unit. The term "unit area" is used herein to refer to the total area of the pane surface (e.g., surface 120) that the aerogel sheet(s) 200 are carried alongside. In embodiments that involve only a single sheet of aerogel, it can optionally cover any desired percentage of the unit area noted in this paragraph.

For embodiments involving multiple aerogel sheets 200, they can have any desired shape and tiling arrangement. As non-limiting examples, such aerogel sheets 200 can be square, rectangular, or hexagonal in shape. In some embodiments, edges 205 of each aerogel sheet 200 are aligned both vertically and horizontally with edges 205 of adjacently-positioned aerogel sheets 200 (see, e.g., FIG. 2). In certain embodiments, the aerogel sheets 200 are rectangular strips that extend the entire, or substantially the entire, height or width of the glass assembly unit (see FIG. 3). In other embodiments, at least some of the aerogel sheets 200 have shapes different from some of the other aerogel sheets 200 (see FIG. 4). While certain exemplary tiling configurations are shown in FIGS. 2-5, many other tiling configurations can be used.

In addition, the size of the aerogel sheets 200 is not particularly limited. In some embodiments, all of the aerogel sheets 200 have the same dimensions (see, e.g., FIG. 2). In other embodiments, as shown in the non-limiting example of FIG. 4, some of the aerogel sheets 200 have different dimensions (e.g., a greater length) compared to some of the other aerogel sheets 200.

Preferably, each of the aerogel sheets 200 has a length and a width of at least 10 cm. For each aerogel sheet 200 used in embodiments involving multiple aerogel sheets 200 arranged in a tiled configuration, the length, the width, or both are preferably less than 1 meter. Such dimensions allow the aerogel sheets 200 to be conveniently scaled-up so as to cover large areas between two glass sheets 100, 110 of a glass assembly unit, while still allowing such aerogel sheets 200 to be dried using a smaller high-pressure vessel. Skilled artisans will appreciate that larger or smaller aerogel sheets 200 may alternatively be used, depending on the aerogel production process and equipment used, as well as the size and configuration of the desired units.

The optical device 10 shown in FIG. 1 is an insulating glazing unit ("IG" unit) 40. Here, the illustrated IG unit 40 comprises the two glass sheets 100, 110, multiple aerogel sheets 200, and a between-pane space 50 located between the two glass sheets 100, 110. The aerogel sheets 200 are arranged in the tiled configuration inside the between-pane space 50 and are adhered to an interior surface 120 of the first glass sheet 100. By saying that one or more aerogel sheets 200 are "adhered to" a surface of a glass sheet, this does not require any separate adhesive. It also does not require the aerogel to contact the glass; there may be a coating or layer therebetween. Thus, although "adhered to" may involve direct contact, and in some cases does involve a separate adhesive, the broader meaning as used herein is "carried alongside." This can optionally mean the aerogel is supported by the glass surface, and/or bonded to the glass surface, and in some preferred embodiments the aerogel does contact the glass surface. In some embodiments, there is at most one layer (e.g., an adhesive layer) between each aerogel sheet 200 and the glass.

In certain embodiments, the between-pane space 50 is filled with a thermally-insulative gas mix, such as a mix of 90% argon and 10% air. This, however, is not required. For example, the IG unit 40 may alternatively be filled with a desired single gas or air.

Figure 9:
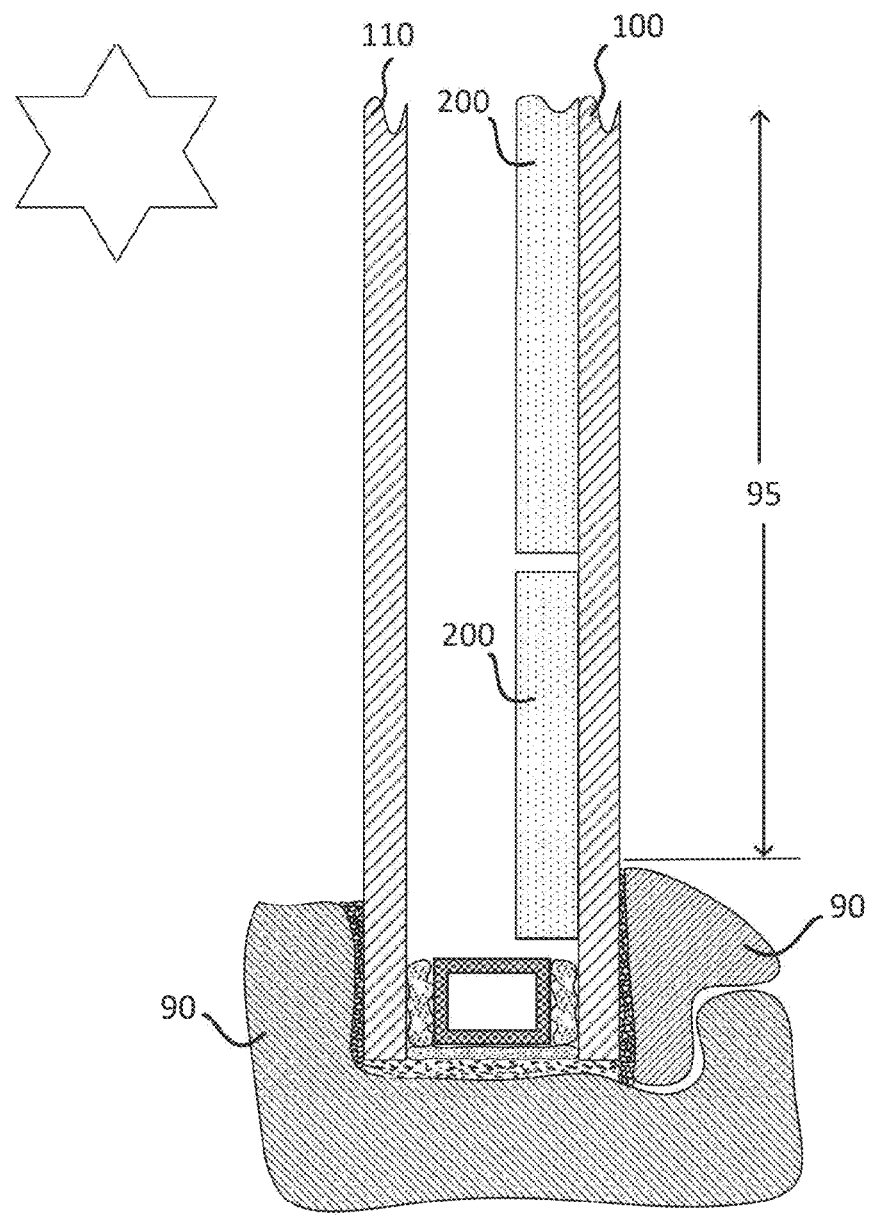
FIG. 9 is a schematic, broken-away, cross-sectional side view of an insulating glazing unit mounted in a frame in accordance with certain embodiments of the invention, with outermost edges of the aerogel sheets positioned outside the vision area.
Figure 12:
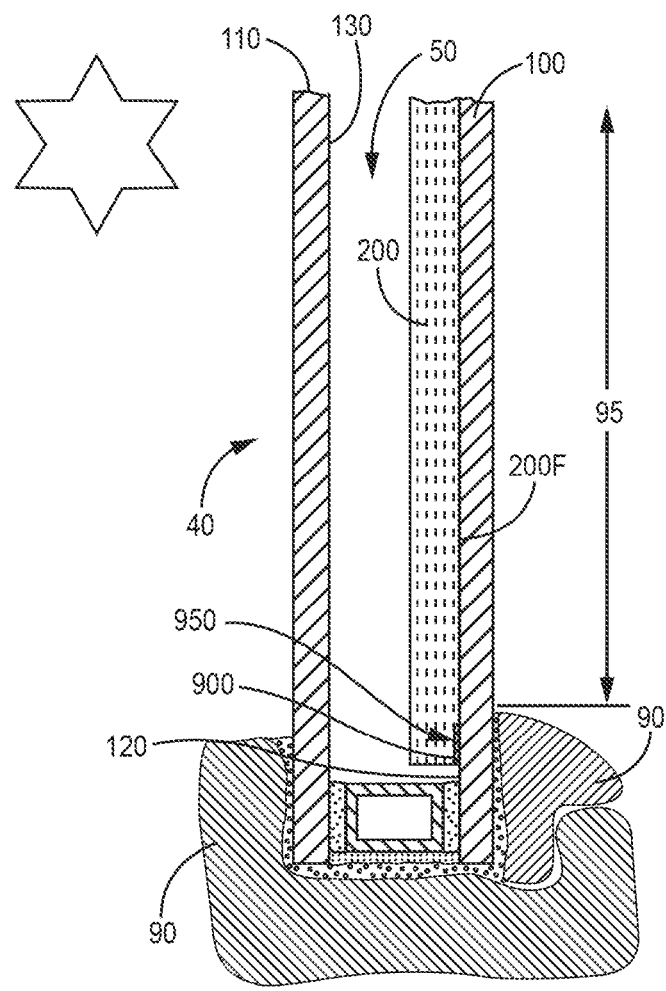
FIG. 12 is a broken-away, schematic, cross-sectional view of a multiple-pane insulating glazing unit mounted in a frame in accordance with certain embodiments of the invention.

In some embodiments, the second glass sheet 110 is an outboard pane that defines both a #1 surface (i.e., surface 135) and a #2 surface (i.e., surface 130), while the first glass sheet 100 is an inboard pane that defines both a #3 surface (i.e., surface 120) and a #4 surface (i.e., surface 125). The IG unit 40 can optionally be mounted in a frame 90 (e.g., as shown in FIGS. 9 and 12), e.g., such that the #1 surface is exposed to an outdoor environment, while the #4 surface is exposed to an indoor environment.

The aerogel sheet(s) 200 can be adhered to either the #2 surface or the #3 surface of the IG unit 40. Another option is to have one or more aerogel sheets on each of the #2 and the #3 surfaces. While FIG. 1 shows a double-pane IG unit, other embodiments provide a triple-pane IG unit having one or more aerogel sheets 200 on either the #2 surface, the #3 surface, the #4 surface, or the #5 surface. In triple-pane embodiments, one or more aerogel sheets can optionally be provided on both the #3 surface and either the #4 or #5 surface. Another option is to provide one or more aerogel sheets on both the #2 surface (e.g., for applications where a low-emissivity or solar control coating is on the #3 surface) and the #4 or #5 surface.

In some embodiments, the IG unit 40 also includes a low-emissivity coating 70. In the embodiment of FIG. 1, the #2 surface bears the low-emissivity coating 70. In embodiments of this nature, the one or more aerogel sheets 200 can be adhered to the #3 surface (i.e., surface 120) and can be spaced from the low-emissivity coating 70. Alternatively, the aerogel can be on the #2 surface while a low-emissivity or solar control coating is on the #3 surface. In certain preferred embodiments, the one or more aerogel sheets 200 are spaced from the low-emissivity coating 70 by at least 2 mm but not more than 15 mm (e.g., by 4-15 mm, 5-12 mm, or 10-15 mm).

When provided, the low-emissivity coating 70 preferably includes at least one silver-inclusive film, which desirably contains more than 50% silver by weight (e.g., a metallic silver film). In certain preferred embodiments, the low-emissivity coating 70 includes three or more infrared-reflective films (e.g., silver-containing films). Low-emissivity coatings having three or more infrared-reflective films are described in U.S. patent application Ser. No. 11/546,152 and U.S. Pat. Nos. 7,572,511 and 7,572,510 and 7,572,509 and 11/545,211 and 7,342,716 and 7,339,728, the teachings of each of which are incorporated herein by reference. In some cases, the low-emissivity coating 70 includes four silver layers. In other cases, the low-emissivity coating can be a "single silver" or "double silver" low-emissivity coating, which are well-known to skilled artisans. Advantageous coatings of this nature are commercially available from, for example, Cardinal CG Company (Eden Prairie, Minnesota, U.S.A.).

The double-pane IG unit 40 can optionally further include a transparent conductive oxide (TCO) coating 85 on an exterior surface of one of the two glass sheets 100, 110. This can optionally be the case for any embodiment of the present disclosure. In some cases, one or more aerogel sheets 200 and a TCO coating 85 are both supported by (e.g., are on opposite surfaces of) the first one of the two glass sheets 100, 110. In such embodiments, the U factor (for a double-pane IG unit 40) preferably is in a range of from 0.11 to 0.19 Btu/(h·f$^{2.\circ}$ F.). More generally, a transparent conductive oxide coating 85 (e.g., on surface 125) can optionally be provided for any embodiment of the present disclosure.

When provided, the transparent conductive oxide coating 85 may comprise, consist essentially of, or consist of indium tin oxide ("ITO"). In alternate embodiments, zinc aluminum oxide, SnO:Sb, sputtered SnO:F, or another known TCO is used. Thus, in certain embodiments, the transparent conductive oxide coating 85 comprises (e.g., is) a sputtered film that includes tin (e.g., comprising tin oxide together with antimony, fluorine, or another dopant). In some cases, the TCO film (which either forms or is part of the transparent conductive oxide coating 85) includes carbon nanotubes. Preferably, the TCO film (which optionally comprises ITO) is provided at a thickness of 10,000 Å or less, such as between about 1,000 Å and about 7,000 Å, e.g., from 1,000 Å to 1,750 Å, such as about 1,300-1,600 Å. For any embodiment where the transparent conductive oxide coating 85 is provided, it can optionally comprise a TCO (e.g., ITO) film having a thickness of from 1,000 Å to 1,750 Å.

The transparent conductive oxide coating 85 can, for example, be a coating of the type described in any of U.S. Pat. No. 9,862,640 or 10,000,965 or 10,000,411 or 11,155, 493, the teachings of which concerning the transparent conductive oxide coating are hereby incorporated herein by reference.

Thus, in some cases, the insulating glazing unit 40 includes both a transparent conductive oxide coating 85 and a low-emissivity coating 70. This, however, is not required in all embodiments. For example, in some cases, the insulating glazing unit 40 includes the low-emissivity coating 70 but is devoid of the transparent conductive oxide coating 85. In other cases, both coatings 70, 85 are omitted.

Certain embodiments include a spacer 60 between the two glass sheets 100, 110. The spacer 60 can be adhered to the two glass sheets 100, 110 by one or more beads of sealant 55, 58 as is conventional and well-known to skilled artisans. The spacer 60 may be a conventional metal channel spacer, e.g., formed of stainless steel or aluminum. Or, it can comprise polymer and metal, or just polymer (e.g., foam). The spacer can alternatively be an integral part of a sash, frame, etc. so as to maintain the IG unit in the desired configuration. In some embodiments, the one or more aerogel sheets 200 do not contact the spacer 60. For example, the one or more aerogel sheets 200 (or at least one or more aerogel sheets that are adjacent the spacer) may be separated (i.e., spaced apart) from the spacer 60 by about 1 mm to about 5 mm (e.g., about 2-4 mm, such as about 3 mm). When provided, the sealant 55, 58 between the spacer 60 and the two adjacent glass sheets 100, 110 can also be spaced from the aerogel 200. Reference is made to FIGS. 1, 9, 10, and 12.

In FIG. 1, the spacer 60 is shown with a primary sealant 55 (e.g., comprising two regions, e.g., "beads," of sealant on opposite sides of the spacer) and a secondary sealant 58. Another option is to omit the secondary sealant, in favor of simply having the primary sealant. Or, a single deposit of primary sealant can be provided along both sides of the spacer and on the outside wall of the spacer. Various other known sealant arrangements/systems can alternatively be used. In FIG. 1, the primary sealant 55 is closest to (but spaced from) the aerogel sheets 200. Similarly, in FIGS. 10 and 12, the primary sealant is closest to (but spaced from) the aerogel sheet.

In other cases, the spacer may be omitted while one or more beads of sealant (optionally together with a moisture vapor barrier) are provided about the perimeter of the unit so as to encompass the one or more aerogel sheets 200. In some cases of this nature, the one or more aerogel sheets 200 themselves assist in holding the glass sheets 100, 110 apart by the desired distance. In such cases, there may be no gas gap alongside the one or more aerogel sheets 200.

Figure 5:
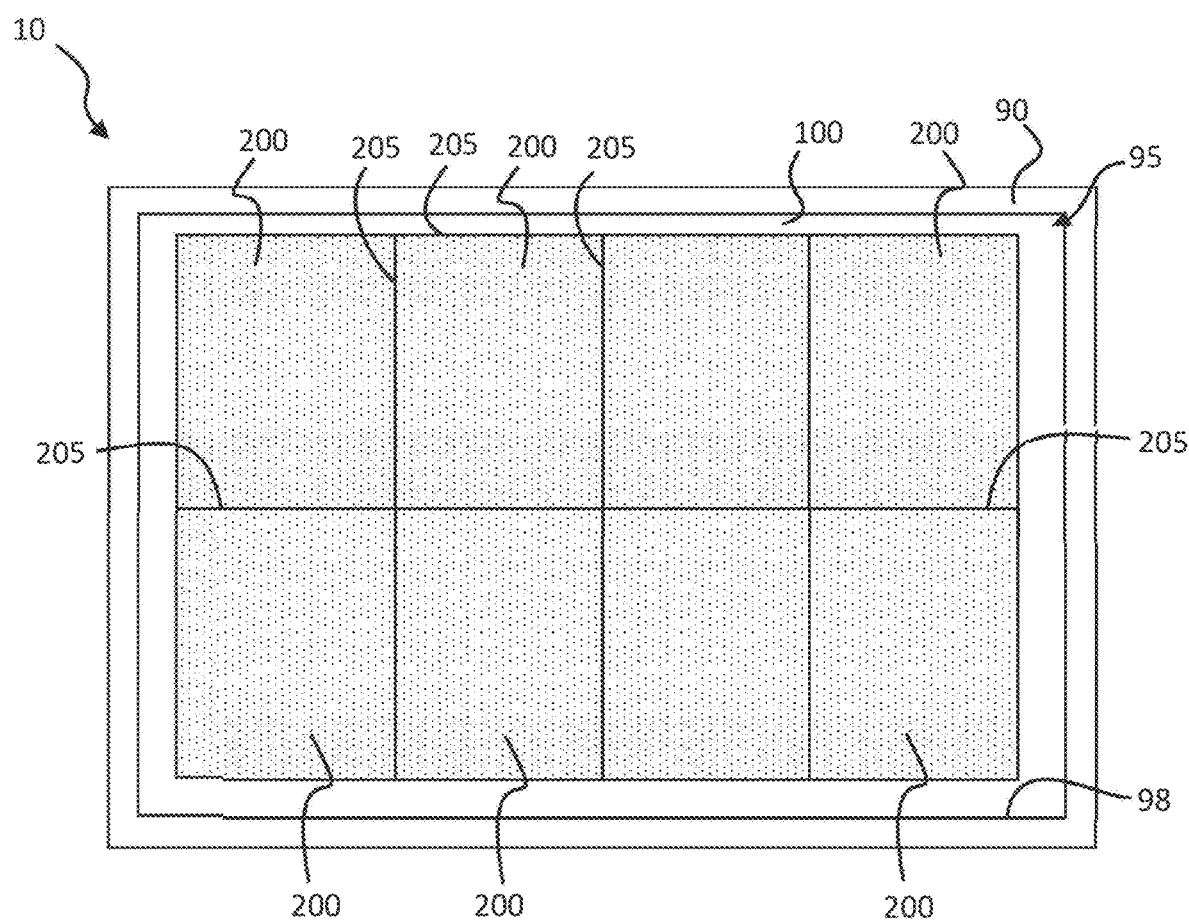
FIG. 5 is a schematic front view of a glass assembly unit mounted in a frame in accordance with yet other embodiments of the invention.

The multiple-pane insulating glazing unit 40 has a vision area 95. As used herein, the term "vision area" refers to the area of the IG unit 40 through which a person is able to see once the IG unit is mounted operably in a frame. In FIG. 5, for example, the vision area 95 of the IG unit 40 is shown. In embodiments where the IG unit 40 is mounted in a frame 90, the frame 90 may delineate the vision area 95 (e.g., such that the vision area 95 is delineated by an interior edge 98 of the frame 90). Reference is made to FIGS. 9 and 12. The perimeter edges of the aerogel sheet or sheets 200 can optionally be located outside of the vision area 95 (e.g., so as to be positioned at locations that will be concealed from view by a frame 90). While that is not the case in FIG. 5, advantageous embodiments having such arrangements are discussed below in more detail with reference to FIGS. 9 and 12.

In any embodiment of the present disclosure, the aerogel sheet or sheets 200 may be arranged so as to cover a majority (i.e., greater than 50%) of the vision area 95. In some embodiments, the one or more aerogel sheets 200 cover at least 60%, at least 70%, or at least 80% of the vision area 95 of the IG unit 40. In certain embodiments, the one or more aerogel sheets 200 cover an entirety of the vision area 95.

With reference to the frame 90 that is shown in FIG. 5, or otherwise referenced in the present disclosure, it is to be appreciated that this frame may be a sash or part of a sash (e.g., an exterior weather strip and/or glazing bead). Further, the vision area described above is determined when looking straight at the adjacent pane surface from a vantage point aligned with an outermost perimeter portion of the vision area. To the extent an outboard portion of the frame projects further inwardly than does an inboard portion of the frame (or vice versa), the vision area is to be considered that area that is inward of the frame portion that projects furthest inwardly. This can be appreciated by referring to FIGS. 9 and 12, where an inboard portion of the frame projects further inwardly than does an outboard portion of the frame. In some cases, a further-inwardly-projecting frame portion may be an exterior sash portion comprising vinyl or another polymer.

Thus, in some embodiments, one or more aerogel sheets 200 are arranged on an IG unit 40 so as to have outermost edges positioned such that those edges will be outside the vision area 95 when the IG unit 40 is mounted operably in a frame 90, such as a sash. This can optionally be the case for any embodiment of the present disclosure (including the laminated glass embodiments). In some embodiments of this nature, a plurality of gaps 210 between adjacent aerogel sheets 200 are located within the vision area 95. Additionally or alternatively, the IG unit 40 may include a spacer 60 and outermost edges of the one or more aerogel sheets 200 can optionally be spaced from the spacer 60, e.g., by the separation distances noted above. While FIG. 9 shows the aerogel in the form of multiple spaced-apart sheets, it can alternatively have just a large single aerogel sheet with its perimeter edges positioned so as to be outside the vision area when the IG unit 40 is mounted in a frame 90. Furthermore, in such embodiments, the aerogel sheet(s) can optionally have any of the dimensions, properties, or both described elsewhere in this disclosure.

As discussed above, the one or more aerogel sheets 200 can be adhered to an interior surface (e.g., the #3 surface) of the first glass sheet 100. In some embodiments, the one or more aerogel sheets 200 adhere to the glass surface through van der Waals forces. In other embodiments, the one or more aerogel sheets 200 are adhered to the first glass sheet 100 by an optical adhesive, optionally such that portions (e.g., a central portion) of the one or more aerogel sheets 200 are devoid of the optical adhesive. In embodiments of this nature, the optical adhesive can be located at a perimeter of the one or more aerogel sheets 200. In still other embodiments, the one or more aerogel sheets 200 are adhered to the first glass sheet 100 by a non-optical adhesive, optionally such that portions (e.g., a central portion) of the one or more aerogel sheets 200 are devoid of the non-optical adhesive. In embodiments of this nature, the non-optical adhesive can be located at a perimeter of the one or more aerogel sheets 200.

Figure 10:
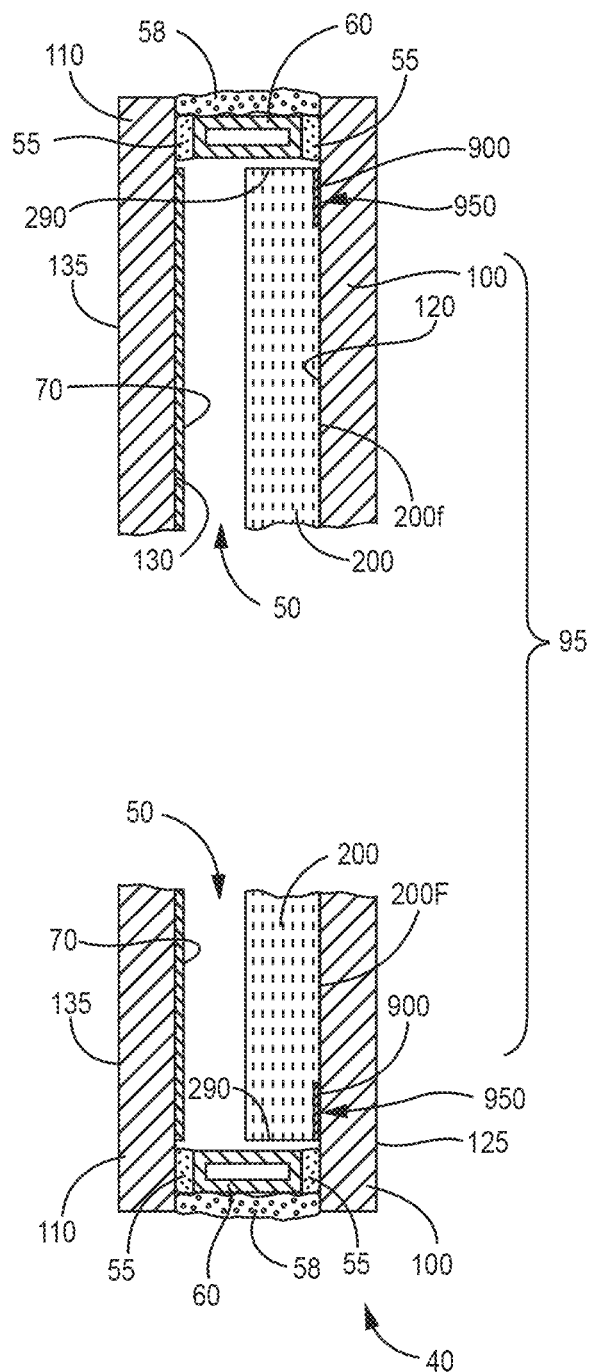
FIG. 10 is a broken-away, schematic, cross-sectional view of a multiple-pane insulating glazing unit in accordance with certain embodiments of the invention.
Figure 11:
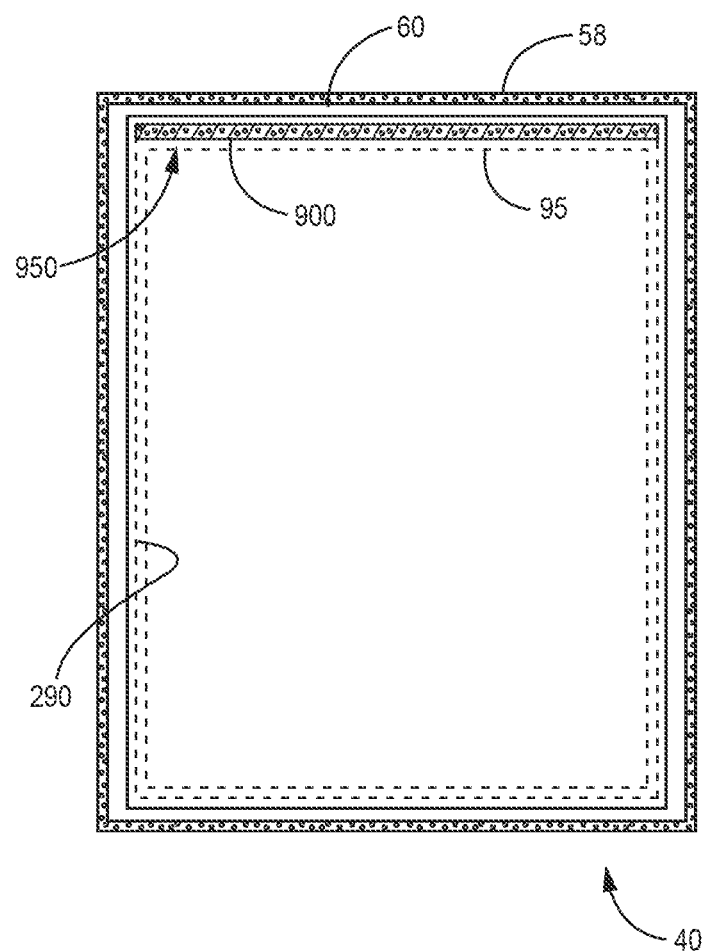
FIG. 11 is a schematic, front view of a multiple-pane insulating glazing unit in accordance with certain embodiments of the invention.

Thus, the aerogel can optionally be provided in the form of a single aerogel sheet, as noted above. Some examples are shown in FIGS. 10-12. Here, the multiple-pane insulating glazing unit 40 includes two glass sheets 100, 110, a spacer 60, and the aerogel sheet 200. In the embodiments of FIGS. 10-12, the aerogel sheet 200 is located between the two glass sheets 100, 110, a gas gap is located alongside the aerogel sheet 200, and the spacer 60 is connected by sealant 55, 58 to the two glass sheets 100, 110. Moreover, in these embodiments, the multiple-pane insulating glazing unit 40 further includes an adhesive (optionally an optical adhesive) 900 adhering the aerogel sheet 200 to an interior surface (120 or 130) of one of the two glass sheets 100, 110, such that a face (e.g., a first face) 200F of the aerogel sheet is carried alongside that interior surface and has a portion that is devoid of adhesive 900. Preferably, the portion of face 200F that is devoid of adhesive 900 includes the portion of face 200F that is located in the vision area 95 of the multiple-pane insulating glazing unit 40. This is perhaps best appreciated by referring to FIGS. 10 and 12. Furthermore, the aerogel sheet 200 preferably spans an entirety of the vision area 95.

FIGS. 10 and 12 show the aerogel sheet 200 adhered to interior surface 120, which is a #3 surface. It is to be appreciated, however, that the aerogel sheet can alternatively be adhered to surface 130, which is a #2 surface.

In the present embodiments, the area(s) of face 200F that are devoid of adhesive 900 are carried alongside the noted interior surface (120 or 130). That may be (or include) a central area, which is located (at least in part) in the vision area 95 of the IG unit 40. In such cases, the central area of face 200F may be in contact with the noted interior surface (120 or 130), and may be bonded to such interior surface by van der Waals forces.

Thus, the invention provides certain embodiments wherein a central area of face 200F is devoid of adhesive 900 and is bonded to the noted interior surface (120 or 130) by van der Waals forces, while adhesive 900 adheres face 200F to the noted interior surface at a perimeter area of face 200F that is located outside the vision area 95. Reference is made to FIGS. 10-12. Another possibility is for the central area of face 200F to bear an optical adhesive and for adhesive 900 (which can be a different, non-optical adhesive) to be provided at a perimetrical adhesive field 950.

The adhesive 900 should be selected for compatibility with both glass and the aerogel material (which, for example, may comprise silica). One example of an optical adhesive is Norland Optical Adhesive 89 (UV cured), which is commercially available from Norland Products Inc. (Cranbury, New Jersey, USA). One example of a non-optical adhesive is MG Chemicals 1035—Premium RTV Silicone Adhesive, which is commercially available from MG Chemicals, Ltd. (Burlington, Ontario, Canada). In selecting the adhesive 900, curing mechanism, longevity, and adhesion strength may guide selection.

In the present embodiments, adhesive 900 adhering the aerogel sheet 200 to an interior surface of one of the two glass sheets 100, 110 preferably is located outside the vision area 95 of the multiple-pane insulating glazing unit 40. This can be seen in the non-limiting embodiments of FIGS. 10-12. Since adhesive 900 is outside the vision area 95, it need not be optical adhesive. For example, it can be opaque or translucent. If desired, however, it can be transparent.

If the desired adhesive material is visible or otherwise impacts properties, or for ease of manufacturing or reducing material use, it may be advantageous to locate adhesive 900 outside the vision area 95. In the embodiments of FIGS. 10-12, adhesive 900 is located entirely outside the vision area 95. In addition, the aerogel sheet 200 preferably spans an entirety of the vision area 95. In other embodiments, only a majority of the adhesive is located outside the vision area, or the adhesive is at least substantially entirely located outside the vision area.

In some of the present embodiments, the multiple-pane insulating glazing unit 40 has a rectangular shape and includes a top edge region, a bottom edge region, a first side edge region, and a second side edge region, and the perimetrical adhesive field 950 (where adhesive 900 is located) is at the top edge region of the multiple-pane insulating glazing unit, whereas the bottom edge region is devoid of adhesive 900. In such cases, the first and second side edge regions of the multiple-pane insulating glazing unit 40 may also be devoid of adhesive 900. Reference is made to the embodiment of FIG. 11. In other embodiments, adhesive 900 may be provided at the top and bottom edge regions of the multiple-pane insulating glazing unit, whereas the first and second side edge regions are devoid of adhesive 900. Another possibility is to provide spaced-apart adhesive regions collectively defining the perimetrical adhesive field. Such a series of spaced-apart regions of adhesive 900 may be provided only along the top edge region of the multiple-pane insulating glazing unit, or along both the top and the bottom edge regions, or along the top, bottom, first side edge, and second side edge regions. Another possibility is to only provide a region of adhesive in each of two or more (e.g., four) corner regions of the multiple-pane insulating glazing unit.

Furthermore, certain embodiments of the invention provide a glazing assembly comprising a frame 90 and a multiple-pane insulating glazing unit 40 mounted in the frame such that a vision area 95 of the glazing assembly is located inwardly of the frame. In these embodiments, the multiple-pane insulating glazing unit 40 includes two glass sheets 100, 110, a spacer 60, and an aerogel sheet 200. The aerogel sheet 200 is located between the two glass sheets 100, 110, and a gas gap is located alongside the aerogel sheet. The spacer 60 has two opposed sides sealed respectively to the two glass sheets 100, 110 by first and second regions of sealant 55. The glazing assembly further includes a perimetrical adhesive field 950 where adhesive 900 adheres the aerogel sheet 200 to an interior surface (120 or 130) of one of the two glass sheets 100, 110. The perimetrical adhesive field 950 is located outside the vision area 95 of the glazing assembly, such that the vision area 95 is devoid of adhesive 900. Moreover, the aerogel sheet 200 preferably spans an entirety of the vision area 95.

In some of the foregoing glazing assembly embodiments, the glazing unit 40 mounted in the frame 90 has a rectangular shape and includes a top edge region, a bottom edge region, a first side edge region, and a second side edge region, and the perimetrical adhesive field 950 (and adhesive 900) is at the top edge region of the multiple-pane insulating glazing unit, whereas the bottom edge region is devoid of adhesive 900. In such cases, the first and second side edge regions of the glazing unit 40 may also be devoid of adhesive 900. In other embodiments, the perimetrical adhesive field (and adhesive 900) is at the top and bottom edge regions of the multiple-pane insulating glazing unit, whereas the first and second side edge regions of the glazing unit 40 are devoid of adhesive 900.

In the foregoing embodiments, the aerogel sheet 200 preferably is spaced apart from the spacer 60, perhaps by about 1 mm to about 5 mm, e.g., or by about 2 mm to about 4 mm. As shown in some of the figures, the aerogel sheet 200 preferably is spaced apart from the spacer 60 and from adjacent sealant 55, e.g., by a distance in any one or more ranges noted above in this paragraph. The spacer 60 can have an outside wall, and in some cases, a secondary sealant 58 is provided on the outside wall of the spacer.

Adhesive 900 preferably is located near the edge of the glass sheet (100 or 110) to which it is adhered. This can be appreciated with continued reference to FIGS. 10-12. Preferably, adhesive 900 is spaced apart from the adjacent edge of the glass sheet to which it is adhered. In some embodiments, this spacing (measuring from the side of adhesive 900 that is closest to the adjacent edge of the glass sheet to which it is adhered) is less than 2 inches, less than 1.75 inches, less than 1.5 inches, or even less than 1.25 inches. In fact, certain embodiments have this spacing at less than 1 inch, such as 0.75 inch or even 0.5 inch. Preferably, this spacing is at least 0.1 inch, or at least ¼ inch, in addition to being within any range noted above in this paragraph. In addition to having such spacing, the perimetrical adhesive field 950 preferably is located outside the vision area 95, such that the vision area 95 is devoid of adhesive 900, and the aerogel sheet 200 preferably spans an entirety of the vision area 95. Moreover, if desired, the single aerogel sheet 200 can be replaced with a plurality of aerogel sheets 200.

The perimetrical adhesive field 950 preferably has a narrow width (as measured inwardly, away from the adjacent edge of the glass sheet to which adhesive 900 is adhered). In some cases, the width of the perimetrical adhesive field 950 is less than 1.5 inches, less than 1 inch, or even less than 0.9 inch. In certain embodiments, the width of the perimetrical adhesive field 950 is in a range of from 1 mm to 25 mm, or in a range from 2 mm to 15 mm, such as about 10 mm.

In certain embodiments, the perimetrical adhesive field 950 occupies (and/or the adhesive 900 contacts) less than 10% of the total area of face 200F, or even less than 7%, such as in a range of 1%-5%. This can optionally be the case for any of various embodiments described herein, including the embodiments shown in FIGS. 10-12. In such cases, adhesive 900 preferably is located outside the vision area 95, such that the vision area 95 is devoid of adhesive 900. Moreover, the aerogel sheet 200 preferably spans an entirety of the vision area 95.

Following are a few non-limiting examples.

Example 1: 4 feet×4 feet glass sheet size, 0.5 inch wide adhesive field all the way around the perimeter, starting at 1 inch in from the glass edge. Here, the area of the adhesive field is 46×46−45×45=91 square inches of adhesive for 2116 square inches of face 200F, such that the adhesive field occupies about 4.3% of the total area of face 200F.

Example 2: 2 feet×5 feet glass sheet size, 0.75 inch wide adhesive along top and bottom, starting at 0.75 inch in from the glass edge. Here, the area of the adhesive field is 22.5×0.75×2=33.75 square inches of adhesive for 1316.25 square inches of face 200F, such that the adhesive field occupies about 2.6% of the total area of face 200F.

Example 3: 2 feet×3 feet glass sheet size, 0.25 inch wide adhesive field all the way around the perimeter, starting at 0.5 inch in from the glass edge. Here, the area of the adhesive field is (23×35)−(22.5×34.5)=28.75 square inches of adhesive for 805 square inches of face 200F, such that the adhesive field occupies about 3.6% of the total area of face 200F.

The foregoing examples represent a group of embodiments wherein a face 200F of an aerogel sheet 200 is adhered to a desired surface (120 or 130) of a glass sheet (100 or 110) by an adhesive field that occupies a small area (e.g., less than 10%, less than 7%, or even less than 6%, such as in a range of 1%-5%) of face 200F. In embodiments of this nature, the aerogel can optionally span an entirety of the vision area 95, and the aerogel may be one large sheet or it may comprise a plurality of aerogel sheets. Moreover, the adhesive 900 may be entirely (or at least substantially entirely) outside the vision area 95.

In certain embodiments, the invention provides a glazing assembly comprising a frame and a multiple-pane insulating glazing unit mounted in the frame such that a vision area of the glazing assembly is located inwardly of the frame. In the present embodiments, the multiple-pane insulating glazing unit includes two glass sheets, a spacer, and an aerogel sheet. Moreover, in the present embodiments, the aerogel sheet is located between the two glass sheets, a gas gap is located alongside the aerogel sheet, and the spacer has two opposed sides sealed respectively to the two glass sheets by first and second sealant regions. In the present embodiments, the glazing assembly further includes a perimetrical adhesive field where adhesive secures the aerogel sheet to an interior surface of one of the two glass sheets. The perimetrical adhesive field is located outside the vision area of the glazing assembly, such that the vision area of the glazing assembly is devoid of the adhesive.

Certain embodiments of the invention provide a multiple-pane insulating glazing unit that includes two glass sheets, a spacer, and an aerogel sheet. In the present embodiments, the aerogel sheet is located between the two glass sheets, a gas gap is located alongside the aerogel sheet, and the spacer has two opposed sides sealed respectively to the two glass sheets by first and second sealant regions. Moreover, in the present embodiments, the multiple-pane insulating glazing unit further includes a perimetrical adhesive field where adhesive secures the aerogel sheet to an interior surface of one of the two glass sheets. The perimetrical adhesive field is located outside a vision area of the multiple-pane insulating glazing unit, such that the vision area of the multiple-pane insulating glazing unit is devoid of the adhesive.

In some embodiments, multiple aerogel sheets 200 are provided in a tiled configuration that is characterized by each of the aerogel sheets 200 being spaced from an adjacent one of the aerogel sheets 200 by a gap 210. Advantageously, this spacing arrangement may help ensure that the aerogel sheets 200 will not become damaged. Moreover, the gaps 210 are narrow enough to prevent or minimize convection between the aerogel sheets 200. In many embodiments, the gap distance will be no greater than 5 mm. The distance of each gap 210 preferably is in a range of from 20 μm to 2 mm (e.g., from 40 μm to 1.5 mm, or from 60 μm to 1.0 mm). Each gap 210 preferably contains only gas.

Figure 8A:
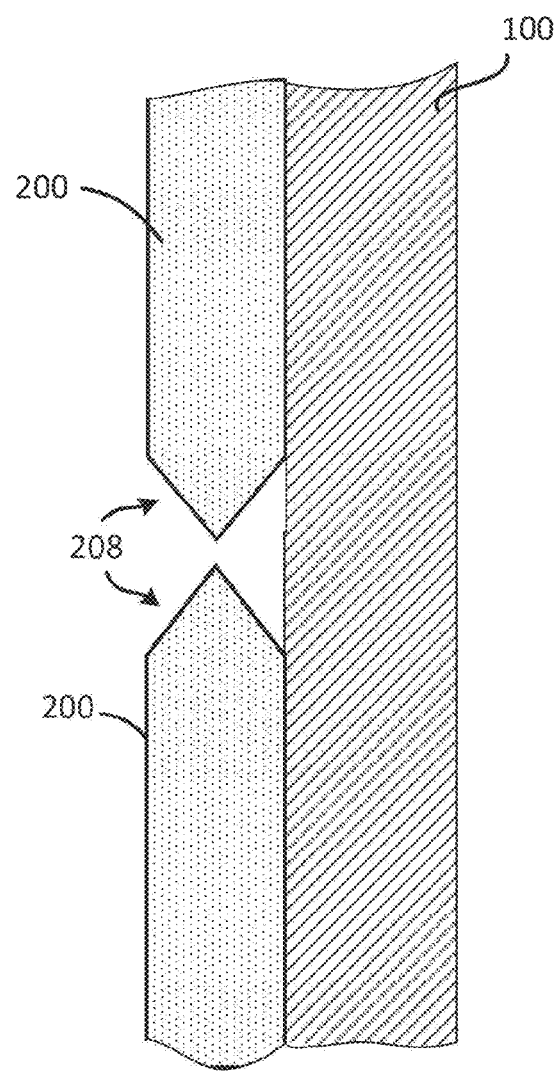
FIG. 8A is a schematic, broken-away, cross-sectional side view of a portion of an optical device in accordance with certain embodiments of the invention, showing the tapered confronting edges of two adjacent aerogel sheets.
Figure 8B:
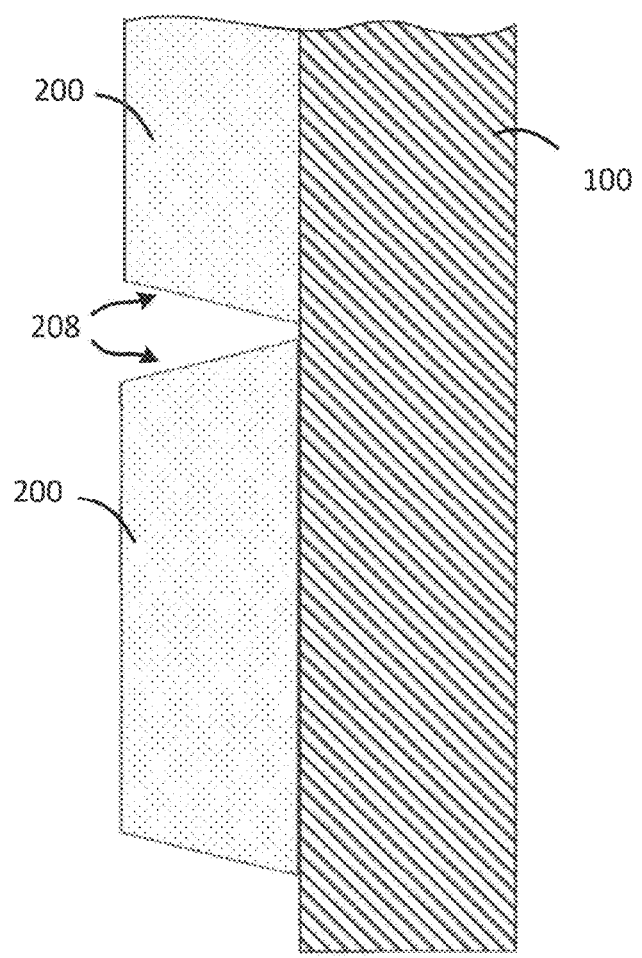
FIG. 8B is a schematic, broken-away, cross-sectional side view of a portion of an optical device in accordance with other embodiments of the invention, showing yet another arrangement of two adjacent aerogel sheets having tapered confronting edges.

In certain embodiments that include gaps 210 between aerogel sheets 200, the edges 205 of the aerogel sheets 200 are shaped so as to reduce the sharpness of the contrast and/or transition between the aerogel sheets 200 and the surrounding gap 210. For example, in some embodiments, each aerogel sheet 200 has a tapered edge configuration, such that each adjacent pair of the aerogel sheets 200 has confronting tapered edges 208. Reference is made to FIGS. 8A and 8B, which depict two non-limiting examples. The taper can be made by cutting a bevel into the edge 205 of the aerogel sheet 200 (e.g., using a knife, sander, or laser), or by using a shaped mold edge when drying the aerogel. Skilled artisans will appreciate that confronting tapered edges 208 are not required and may be omitted in certain embodiments.

Figure 6:
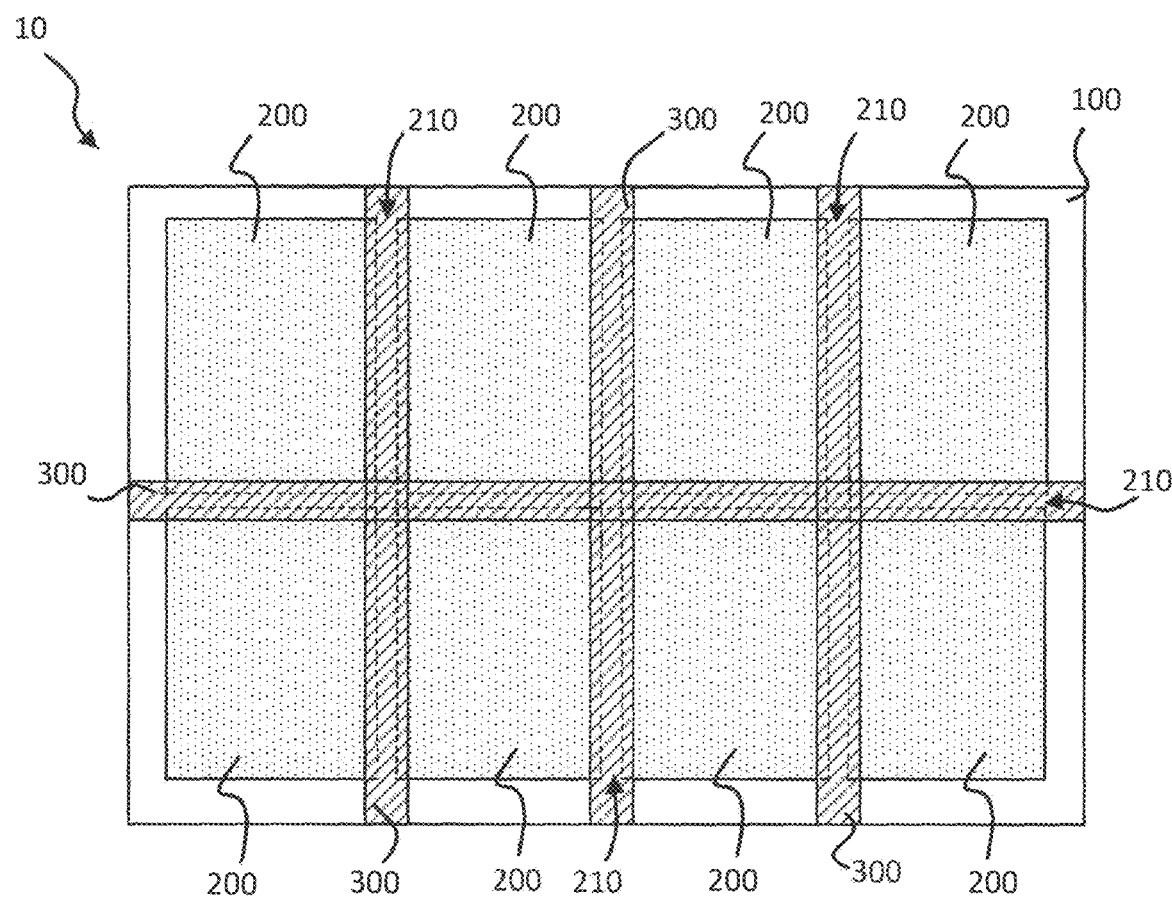
FIG. 6 is a schematic front view of an optical device comprising a plurality of muntin bars in accordance with certain embodiments of the invention.

In certain embodiments, the optical device 10 comprises a plurality of muntin bars 300, as shown in FIG. 6. In embodiments of this nature, each gap 210 can optionally be aligned with one of the muntin bars 300 so as to conceal the gaps 210 from view. Although the muntin bars 300 in FIG. 6 are shown together with aerogel sheets 200 having a particular tiling configuration, skilled artisans will appreciate that muntin bars 300 can be used to conceal the gaps 210 of various different tiling configurations. Moreover, the optical device 10 may include one or more muntin bars that conceal one or more gaps, and one or more muntin bars that do not conceal any gaps.

In certain other embodiments, each gap 210 is arranged as part of a gap pattern that deters bird collisions. Birds sometimes fly into windows and other glazings on high-rise buildings, residential buildings, and other structures. The present embodiment is concerned with creating a gap pattern that results in a glass product that birds can see more easily and avoid. In such embodiments, the gaps 210 between adjacent aerogel sheets 200 are formed into a pattern (e.g., stripes or a grid) specifically designed to deter bird collisions.

In further embodiments, multiple aerogel sheets 200 are provided in a tiled configuration that is characterized by each of the aerogel sheets 200 being in edge-to-edge contact with an adjacent one (or a plurality of adjacent ones) of the aerogel sheets 200. Such a tiling configuration is shown in the non-limiting embodiment of FIG. 5. In certain embodiments where multiple aerogel sheets 200 are arranged in edge-to-edge contact with one another, the aerogel sheets 200 are optionally arranged so as to cover an entirety of the vision area 95.

The between-pane space 50 has a thickness, which is measured from the interior surface 130 of the second glass sheet 110 to the interior surface 120 of the first glass sheet 100. In certain embodiments, the aerogel sheets 200 do not occupy the entire thickness of the between-pane space 50, such that there is a gas gap alongside the aerogel sheet(s) 200 within the between-pane space 50. One example of such a configuration is shown in FIG. 1.

The aerogel sheet(s) 200 have a thickness T. In some embodiments, the aerogel sheet(s) 200 have a thickness in a range of from 1.5 mm to 15 mm, such as greater than 2 mm but less than 8 mm, or from 2 mm to 4 mm (e.g., 3 mm). It is to be appreciated, however, that other thicknesses can be used in certain embodiments.

A ratio of the thickness T of the aerogel sheet(s) 200 to the thickness of the between-pane space 50 preferably is between 0.15 and 0.85. In some embodiments, the thickness of the between-pane space 50 is at least 10 mm, optionally together with the thickness of the aerogel sheet(s) 200 being greater than 2 mm but less than 8 mm. In certain preferred embodiments, the aerogel sheet(s) 200 occupy less than 50% of the thickness of the between-pane space 50 (e.g., less than 45%, less than 40%, or even less than 35% of the thickness of the between-pane space 50).

In other embodiments, the aerogel sheet(s) 200 occupy a majority of the thickness of the between-pane space 50. In such instances, the thickness T of each aerogel sheet 200 preferably is greater than 8 mm but less than 15 mm (e.g., about 10 mm), while the thickness of the gas gap alongside the aerogel sheet(s) 200 is optionally less than 5 mm (e.g., about 3 mm).

Each aerogel sheet 200 preferably has an index of refraction of less than 1.1 (such as between 1.0 and 1.1, or more preferably between 1.0 and 1.04). This index of refraction (at 550 nm) can optionally be provided in combination with each aerogel sheet 200 having a thickness in a range of from 1.5 mm to 15 mm (such as a thickness of greater than 2 mm but less than 8 mm). It is to be appreciated, however, that the index of refraction values noted in this paragraph are optional, and a higher index of refraction may be provided in certain embodiments.

Each aerogel sheet 200 preferably is formed of materials, and made by a process, that allows the aerogel sheet(s) 200 to have a haze of less than 4% (e.g., less than 3%, less than 2%, or even less than 1%). This haze level can optionally be provided in combination with each aerogel sheet 200 having an index of refraction of less than 1.1 (including any of the particular ranges noted in the preceding paragraph). It is to be appreciated, however, that this haze level is optional. For example, higher haze levels may be suitable depending on the intended application.

Haze can be measured in well-known fashion, e.g., using a BYK Haze-Gard plus instrument. Reference is made to ASTM D 1003-00: Standard Test method for Haze and Luminous Transmittance of Transparent Plastics, the contents of which are incorporated herein by reference.

The aerogel sheet(s) 200 preferably have a visible transmittance of greater than 90%. Thus, for any embodiment of the present disclosure, the visible transmittance of each aerogel sheet 200 can optionally be greater than 90%. In certain preferred embodiments, the visible transmittance is greater than 92%, greater than 95%, or even up to 97%, for each aerogel sheet 200.

The term "visible transmittance" is well known in the art and is used herein in accordance with its well-known meaning to refer to the percentage of all incident visible radiation that is transmitted through an object (e.g., through an aerogel sheet 200). Visible radiation constitutes the wavelength range of between about 380 nm and about 780 nm. Visible transmittance, as well as visible reflectance, can be determined in accordance with NFRC 300-2017, Standard Test Method for Determining the Solar and Infrared Optical Properties of Glazing Materials and Fading Resistance of Systems. The well-known LBNL WINDOW 7.4 computer program can be used in calculating these and other reported optical properties.

Each aerogel sheet 200 preferably exhibits a transmitted color characterized by "a" and "b" color coordinates that are each between −2 and 2. The present discussion of color properties is reported using the well-known color coordinates of "a" and "b." In more detail, the color coordinates are indicated herein using the subscript h (i.e., $a_h$ and $b_h$) to represent the conventional use of the well-known Hunter Lab Color System (Hunter methods/units, Ill. D65, 10 degree observer). The present color properties can be calculated as specified in "Insight on Color," "Hunter L, a, b Color Scale," Applications Note, Vol. 8, No. 9, 06/08 (2008), the relevant teachings of which are incorporated herein by reference.

In addition, each aerogel sheet 200 has a low density. In certain embodiments, each aerogel sheet 200 has a density of less than 250 kg/m³. In some embodiments, each aerogel sheet 200 has a density of less than 235 kg/m³, such as less than 220 kg/m³, or even less than 200 kg/m³.

The aerogel sheet(s) 200 also have a low thermal conductivity. In some embodiments, each aerogel sheet 200 has a thermal conductivity at atmospheric pressure of less than 0.015 W/(m·K) but greater than or equal to 0.006 W/(m·K). In certain embodiments, each aerogel sheet 200 has a thermal conductivity at atmospheric pressure of less than 0.03 W/(m·K) but greater than or equal to 0.006 W/(m·K).

Preferably, each aerogel sheet 200 has an R value of between 0.9 and 3.8 ft²·°F.·h/BTU. The R value of each aerogel sheet 200 (in imperial units) can be calculated by dividing the thickness of the aerogel sheet 200 (in meters) by the thermal conductivity, and then multiplying that value by 5.7.

As noted above, the aerogel can be cellulose-based aerogel, e.g., of the nature described in U.S. Patent Application Publication No. US2019/0055373, entitled "Bacterial Cellulose Gels, Process for Producing and Methods of Use." Such aerogels can have all of the properties and features described above. Thus, in any embodiment of the present disclosure, the aerogel can optionally be cellulose-based aerogel. Moreover, as also noted above, another option is for the aerogel 200 to comprise silica, e.g., of the nature described U.S. Patent Application No. 63/318,165, entitled "Silica Wet Gel and Aerogel Materials." These aerogels can have all the properties and features described above. Thus, in any embodiment of the present disclosure, the aerogel can optionally be silica-based aerogel. More generally, any suitable aerogel material can be used in the present embodiments.

In certain embodiments, the first 100 and second 110 glass sheets are part of a laminated glass assembly 80 (e.g., a laminated glass panel) that comprises at least two glass sheets, a polymer interlayer 400, and one or more aerogel sheets 200. Here again, when multiple aerogel sheets 200 are used, the aerogel sheets 200 preferably are arranged in a tiled configuration between the two glass sheets 100, 110. Reference is made to FIG. 7. In some embodiments, the laminated glass assembly also includes a spacer. In other cases, the spacer is omitted and the laminated glass assembly just has one or more beads of sealant at the perimeter of the assembly.

In certain embodiments, both glass sheets 100, 110 can be clear 3 mm soda-lime float glass and the polymer interlayer 400 can be 0.30 inch thick PVB. It is to be appreciated, however, that these details are by no means limiting.

The aerogel sheet(s) 200 of the laminated glass assembly 80 can be arranged in the same manner, and have the same dimensions and material properties, as the aerogel sheet(s) 200 described above for the multiple-pane insulating glazing unit 40. For example, the aerogel sheet(s) 200 can cover a majority of the unit area (and of the vision area) of the laminated glass assembly 80. In addition, in some embodiments involving multiple aerogel sheets 200, the aerogel sheets 200 are arranged in a tiled configuration characterized by each of the aerogel sheets 200 being spaced from an adjacent one (or a plurality of adjacent ones) of the aerogel sheets 200 by a gap distance of no greater than 5 mm. Furthermore, if one or more visible gaps are provided between adjacent aerogel sheets, then one or more muntin bars can optionally be positioned to conceal such gap(s) from view. In other embodiments, a tiled configuration is characterized by each of the aerogel sheets 200 being in edge-to-edge contact with an adjacent one of the aerogel sheets.

The polymer interlayer 400 preferably is a tear-resistant polymer layer. In some cases, it is a sheet of ionoplast plastic. In other cases, it is a sheet of polyvinyl butyral (PVB). Various other materials known to be suitable for the interlayer of a laminated glass panel can also be used.

In some of the present laminated glass embodiments, there may be no spacer such that only one or more beads of sealant (optionally provided with a moisture vapor barrier) encompass the aerogel sheet(s) 200.

In many cases, a laminated glass assembly is produced through two operations: (1) an assembly operation, and (2) an autoclave operation. In the assembly operation, the interlayer is positioned between two glass substrates to form a sandwich, which is then heated (commonly to a temperature of between about 120° F. and about 170° F.) and roller pressed to initiate removal of air trapped between the interlayer and to initiate adhesion of the interlayer to the glass. In the autoclave operation, the sandwich is exposed to an elevated temperature (commonly between about 275° F. and about 300° F.) and an elevated atmospheric pressure (commonly between about 150 psig and about 190 psig) until there is complete adhesion of the interlayer to the glass and complete dissolution of air trapped within the interlayer. It is not uncommon for the autoclave operation to last two hours or four hours per treatment. Various autoclave methods are known to skilled artisans.

In some embodiments involving a laminated glass assembly 80, there are two polymer interlayers 400. In some such embodiments, one or more aerogel sheets 200 are sandwiched between, and laminated to, the two polymer interlayers 400. In such cases, the polymer interlayers 400 are each in contact with one of the glass sheets 100, 110 on opposite sides of the aerogel sheet(s) 200. The interlayer/aerogel/interlayer arrangement may be assembled and laminated in a single operation, or it may be assembled in a separate operation prior to being laminated.

In certain other laminated embodiments, there is only one polymer interlayer 400. In such embodiments, the aerogel sheet(s) 200 are adhered directly to one of the two glass sheets 100, 110. Reference is made to the non-limiting example of FIG. 7.

In certain other laminated embodiments, the polymer interlayer(s) are omitted, and the aerogel replaces the interlayer(s) in the laminate. In embodiments of this nature, the lamination process still takes place, but lamination occurs at a lower pressure than it does for the other laminated embodiments.

In some cases, the laminated glass assembly 80 is made by a non-autoclave process of the nature described in U.S. Pat. Nos. 7,117,914 and 7,143,800, the teachings of which are hereby incorporated herein by reference.

While the present discussions focus on each substrate being a glass sheet, other substrate types (e.g., polycarbonate or other polymeric materials) can alternatively be used.

This disclosure also provides methods for producing the present optical devices. In such methods, a first glass sheet 100 having a surface 120, and a second glass sheet 110 having a surface 130, are provided. The aerogel sheet(s) 200 can be produced in accordance with any conventional method, optionally in accordance with U.S. Patent Application Publication No. US2019/0055373, entitled "Bacterial Cellulose Gels, Process for Producing and Methods of Use." Another possibility is for the aerogel sheet(s) 200 to be produced in accordance with U.S. Patent Application No. 63/318,165, entitled "Silica Wet Gel and Aerogel Materials." Various other processes are known for producing a sheet of silica aerogel. Any suitable aerogel material can be used. The resulting aerogel sheet(s) 200 can be adhered to surface 120 of the first glass sheet 100 (e.g., through van der Waals forces, and/or by using an optical adhesive). As noted above, in some cases, an aerogel sheet is adhered to a central region of a glass sheet by van der Waals forces (i.e., without an adhesive being provided at the central region) while being adhered to a perimeter region of the glass sheet by adhesive 900.

In certain embodiments, adhesive 900 is applied such that, in the resulting IG unit, it is only located between a perimeter region of a face 200F of the aerogel sheet 200 and an interior surface (120 or 130) of one of the glass sheets 100, 110. In such cases, the rest of face 200F can be devoid of adhesive and adhered to the noted interior surface (120 or 130) by van der Waals forces. In the manufacturing process, adhesive 900 may be applied only to a desired perimeter region of the noted interior surface (120 or 130), and the aerogel sheet 200 may thereafter be pressed against that interior surface. The application of adhesive 900 can be done manually or by using an automated adhesive applicator.

In some embodiments, the aerogel is made in standard size molds and is cut to the size and shape required. In other cases, the aerogel can be made in open-top molds of a desired shape and size. After drying, the aerogel can be adhered to the glass either a) directly from the mold; b) after removing the aerogel from the mold; or c) after transferring the aerogel from the mold to some other container and then to the glass.

The aerogel may be placed either manually or, more preferably, with robotics. In some embodiments, the aerogel is adhered to a temporary surface for handling and placement. The aerogel can be picked-up using electrostatic adhesion, e.g., using commercially available Stackit robots manufactured by Grabit, Inc. (Sunnyvale, California, U.S.A.).

A low-emissivity coating 70 preferably is deposited on surface 130 of the second glass sheet 110. Also, prior to applying the aerogel sheet(s) 200 to surface 120 of the first glass sheet 100, a transparent conductive oxide coating 85 can optionally be deposited on surface 125 of the first glass sheet 100. These coatings can be deposited using any thin film deposition technique suitable for depositing the desired film materials at the desired thicknesses. In preferred embodiments, both coatings 70, 85 are deposited by sputtering. Sputtering is well known. One preferred sputtering method is DC magnetron sputtering. Reference is made to Chapin's U.S. Pat. No. 4,166,018, the teachings of which are incorporated herein by reference. If desired, one or both coatings 70, 85 can be sputtered by AC or pulsed DC from a pair of cathodes. HiPIMS and other modern sputtering methods may also be used. If desired, one or both coatings 70, 85 can be omitted.

The two glass sheets 100, 110 can then be assembled together, using any well-known conventional techniques, with a spacer 60 and one or more edge sealants 55, 58. Various types of spacers can be used. As just one example, the spacer can be a conventional metal channel member spacer, e.g., formed of aluminum or stainless steel. A thermally-insulative gas mix (e.g., argon mixed with air) can optionally be provided to fill the gas gap. Various well-known conventional IG unit gas-filling techniques can be used. If desired, the gas gap can be evacuated to a desired vacuum level, optionally a moderate vacuum level, so as to further enhance the thermal insulation properties of the IG unit. As noted above, the IG unit may be a double or triple glazing. Preferably, though, the IG unit is a double glazing, and thus is devoid of a third pane.

While some preferred embodiments of the invention have been described, it should be understood that various changes, adaptations and modifications may be made therein without departing from the spirit of the invention and the scope of the appended claims.

What is claimed is:

1. A glazing assembly comprising a frame and a multiple-pane insulating glazing unit mounted in the frame such that a vision area of the glazing assembly is located inwardly of the frame, the multiple-pane insulating glazing unit comprising two glass sheets, a spacer, and an aerogel sheet, the aerogel sheet being located between the two glass sheets, such that a gas gap is located alongside the aerogel sheet, the spacer having two opposed sides sealed respectively to the two glass sheets by first and second sealant regions, the glazing assembly further comprising a perimetrical adhesive field comprising adhesive securing the aerogel sheet to an interior surface of one of the two glass sheets, the perimetrical adhesive field being located outside the vision area of the glazing assembly, such that the vision area of the glazing assembly is devoid of the adhesive.

2. The glazing assembly of claim 1 wherein the aerogel sheet has opposed first and second faces, wherein the adhesive securing the aerogel sheet to said interior surface is in contact with the first face of the aerogel sheet, and the adhesive contacts less than 10% of the first face of the aerogel sheet.

3. The glazing assembly of claim 2 wherein the adhesive contacts 1-5% of the first face of the aerogel sheet.

4. The glazing assembly of claim 1 wherein the perimetrical adhesive field has a width in a range of from 1 mm to 25 mm.

5. The glazing assembly of claim 1 wherein the adhesive is spaced apart by more than 0.1 inch and less than 1.5 inches from an adjacent edge of the one of the two glass sheets to which the adhesive secures the aerogel sheet.

6. The glazing assembly of claim 1 wherein the multiple-pane insulating glazing unit has a rectangular shape and includes a top edge region, a bottom edge region, a first side edge region, and a second side edge region, the perimetrical adhesive field being at the top edge region of the multiple-pane insulating glazing unit, such that the first and second side edge regions of the multiple-pane insulating glazing unit are devoid of the adhesive.

7. The glazing assembly of claim 6 wherein the bottom edge region is devoid of the adhesive.

8. The glazing assembly of claim 1 wherein the adhesive is opaque or translucent.

9. The glazing assembly of claim 1 wherein the aerogel sheet is spaced apart from the spacer by about 1 mm to about 5 mm.

10. The glazing assembly of claim 1 wherein the aerogel sheet is spaced apart from the spacer and from the first and second sealant regions.

11. The glazing assembly of claim 1 wherein the aerogel sheet spans an entirety of the vision area of the glazing assembly.

12. The glazing assembly of claim 1 wherein the spacer is a metal channel spacer.

13. A multiple-pane insulating glazing unit comprising two glass sheets, a spacer, and an aerogel sheet, the aerogel sheet being located between the two glass sheets, such that a gas gap is located alongside the aerogel sheet, the spacer having two opposed sides sealed respectively to the two glass sheets by first and second sealant regions, the multiple-pane insulating glazing unit further including a perimetrical adhesive field comprising adhesive securing the aerogel sheet to an interior surface of one of the two glass sheets, the perimetrical adhesive field being located outside a vision area of the multiple-pane insulating glazing unit, such that the vision area of the multiple-pane insulating glazing unit is devoid of the adhesive.

14. The multiple-pane insulating glazing unit of claim 13 wherein the aerogel sheet has opposed first and second faces, wherein the adhesive securing the aerogel sheet to said interior surface is in contact with the first face of the aerogel sheet, and the adhesive contacts less than 10% of the first face of the aerogel sheet.

15. The multiple-pane insulating glazing unit of claim 14 wherein the adhesive contacts 1-5% of the first face of the aerogel sheet.

16. The multiple-pane insulating glazing unit of claim 13 wherein the perimetrical adhesive field has a width in a range of from 1 mm to 25 mm.

17. The multiple-pane insulating glazing unit of claim 13 wherein the adhesive is spaced apart by more than 0.1 inch and less than 1.5 inches from an adjacent edge of the one of the two glass sheets to which the adhesive secures the aerogel sheet.

18. The multiple-pane insulating glazing unit of claim 13 wherein the adhesive is opaque or translucent.

19. The multiple-pane insulating glazing unit of claim 13 wherein the aerogel sheet is spaced apart from the spacer.

20. The multiple-pane insulating glazing unit of claim 19 wherein the aerogel sheet is spaced apart from the spacer by about 1 mm to about 5 mm.

21. The multiple-pane insulating glazing unit of claim 13 wherein the multiple-pane insulating glazing unit has a rectangular shape and includes a top edge region, a bottom edge region, a first side edge region, and a second side edge region, the perimetrical adhesive field being at the top edge region of the multiple-pane insulating glazing unit, such that the first and second side edge regions of the multiple-pane insulating glazing unit are devoid of the adhesive.

22. The multiple-pane insulating glazing unit of claim 21 wherein the bottom edge region is devoid of the adhesive.

23. The multiple-pane insulating glazing unit of claim 13 wherein the spacer is a metal channel spacer.

* * * * *